United States Patent
Toba et al.

(10) Patent No.: US 11,271,706 B2
(45) Date of Patent: Mar. 8, 2022

(54) INTERFACE CIRCUIT AND INFORMATION PROCESSING SYSTEM

(71) Applicant: SONY CORPORATION, Tokyo (JP)

(72) Inventors: Kazuaki Toba, Kanagawa (JP); Gen Ichimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/022,356

(22) Filed: Sep. 16, 2020

(65) Prior Publication Data

US 2020/0412514 A1    Dec. 31, 2020

Related U.S. Application Data

(63) Continuation of application No. 16/249,264, filed on Jan. 16, 2019, now Pat. No. 10,805,057, which is a
(Continued)

(30) Foreign Application Priority Data

Jun. 12, 2014  (JP) .............................. JP2014-121641

(51) Int. Cl.
*H04L 5/02*     (2006.01)
*G09G 5/00*     (2006.01)
(Continued)

(52) U.S. Cl.
CPC ............. *H04L 5/02* (2013.01); *G09G 5/006* (2013.01); *G09G 5/008* (2013.01); *H04L 5/22* (2013.01);
(Continued)

(58) Field of Classification Search
CPC . H04L 5/02; H04L 5/22; H04L 9/0825; H04L 25/0272; H04L 25/14; G09G 5/006;
(Continued)

(56) References Cited

U.S. PATENT DOCUMENTS 6,307,543 B1    10/2001   Martin
7,089,444 B1 *   8/2006   Asaduzzaman ......... H04L 7/033
                                                    375/376
(Continued)

FOREIGN PATENT DOCUMENTS

CN     101682589 A    3/2010
EP       2196932 A2   6/2010
(Continued)

OTHER PUBLICATIONS

Office Action for KR Patent Application No. 10-2016-7031545, dated Jun. 1, 2021, 02 pages of English Translation and 07 pages of Office Action.
(Continued)

*Primary Examiner* — Mewale A Ambaye
(74) *Attorney, Agent, or Firm* — Chip Law Group

(57) ABSTRACT

A signal is transmitted at a high speed in a direction opposite to a transmitting direction of a main large-capacity channel. A first transmitting unit transmits a first signal including a clock component to an external device through a transmission path as a differential signal. A second transmitting unit superimposes a second signal including a clock component on the transmission path as an in-phase signal to transmit to the external device. A state notifying unit communicates with the external device through a pair of differential transmission paths included in the transmission path and notifies the external device of a connection state of its own device by a DC bias potential of at least one of the pair of differential transmission paths.

20 Claims, 14 Drawing Sheets

Related U.S. Application Data continuation of application No. 15/314,308, filed as application No. PCT/JP2015/058880 on Mar. 24, 2015, now Pat. No. 10,218,488.

(51) Int. Cl.
*H04L 9/08* (2006.01)
*H04L 25/02* (2006.01)
*H04N 21/4363* (2011.01)
*H04N 21/436* (2011.01)
*H04L 5/22* (2006.01)
*H04L 25/14* (2006.01)
*H04N 5/44* (2011.01)

(52) U.S. Cl.
CPC ........ *H04L 9/0825* (2013.01); *H04L 25/0272* (2013.01); *H04L 25/14* (2013.01); *H04N 5/44* (2013.01); *H04N 21/436* (2013.01); *H04N 21/43635* (2013.01); *G09G 2370/042* (2013.01); *G09G 2370/047* (2013.01); *G09G 2370/12* (2013.01)

(58) Field of Classification Search
CPC ....... G09G 2370/042; G09G 2370/047; G09G 2370/12; G09G 5/008; G09G 5/04; H04N 5/44; H04N 21/436; H04N 21/43635; H04N 5/14
See application file for complete search history.

(56) References Cited

U.S. PATENT DOCUMENTS

| | | | |
|---|---|---|---|
| 8,000,355 B2 | 8/2011 | Ichimura et al. | |
| 2005/0220180 A1 | 10/2005 | Barlev et al. | |
| 2005/0228995 A1* | 10/2005 | Kwak | H04N 21/4405 713/168 |
| 2007/0186015 A1* | 8/2007 | Taft | G09G 5/006 710/16 |
| 2008/0111921 A1 | 5/2008 | Tung et al. | |
| 2008/0131096 A1* | 6/2008 | Magara | H04N 21/4854 386/232 |
| 2008/0133249 A1 | 6/2008 | Hashiguchi et al. | |
| 2009/0251606 A1* | 10/2009 | Tokoro | G09G 5/006 348/554 |
| 2010/0085482 A1 | 4/2010 | Toba et al. | |
| 2010/0128182 A1 | 5/2010 | Ichimura et al. | |

FOREIGN PATENT DOCUMENTS

| | | | | |
|---|---|---|---|---|
| EP | 2222040 A1 * | 8/2010 | | H04J 3/0638 |
| EP | 2222040 A1 | 8/2010 | | |
| JP | 2002-204272 A | 7/2002 | | |
| JP | 2009-130606 A | 6/2009 | | |
| JP | 2013-257730 A | 12/2013 | | |
| KR | 10-2010-0047823 A | 5/2010 | | |
| WO | 2009/066607 A1 | 5/2009 | | |

OTHER PUBLICATIONS

Non-Final Office Action for U.S. Appl. No. 16/249,264, dated Feb. 25, 2020, 10 pages.
Notice of Allowance for U.S. Appl. No. 16/249,264, dated Jun. 15, 2020, 10 pages.
Non-Final Office Action for U.S. Appl. No. 15/314,308, dated Jun. 1, 2018, 22 pages.
Notice of Allowance for U.S. Appl. No. 15/314,308, dated Oct. 10, 2018, 08 pages.
International Search Report and Written Opinion of PCT Application No. PCT/JP2015/058880, dated Jun. 16, 2015, 07 pages of English Translation and 07 pages of ISRWO.
International Preliminary Report on Patentability of PCT Application No. PCT/JP2015/058880, dated Dec. 22, 2016, 07 pages of English Translation and 04 pages of IPRP.
Office Action for KR Patent Application No. 10-2016-7031545, dated Dec. 3, 2021, 27 pages of English Translation and 20 pages of Office Action.

* cited by examiner

FIG. 2

| PIN NUMBER | SIGNAL NAME |
|---|---|
| 1 | TMDS DATA 2 POSITIVE ELECTRODE |
| 2 | TMDS DATA 2 SHIELD |
| 3 | TMDS DATA 2 NEGATIVE ELECTRODE |
| 4 | TMDS DATA 1 POSITIVE ELECTRODE |
| 5 | TMDS DATA 1 SHIELD |
| 6 | TMDS DATA 1 NEGATIVE ELECTRODE |
| 7 | TMDS DATA 0 POSITIVE ELECTRODE |
| 8 | TMDS DATA 0 SHIELD |
| 9 | TMDS DATA 0 NEGATIVE ELECTRODE |
| 10 | TMDS CLOCK POSITIVE ELECTRODE |
| 11 | TMDS CLOCK SHIELD |
| 12 | TMDS CLOCK NEGATIVE ELECTRODE |
| 13 | CEC |
| 14 | Utility |
| 15 | SCL (DDC SERIAL CLOCK) |
| 16 | SDA (DDC SERIAL DATA) |
| 17 | DDC/CEC GROUND |
| 18 | POWER SUPPLY (+5V) |
| 19 | HOT PLUG DETECT (HPD) |

FIG. 5

| MODE | PIN 14 | PIN 19 |
|---|---|---|
| — | Utility | HPD |
| IN-PHASE SIGNAL | Utility + IN-PHASE SIGNAL | HPD + IN-PHASE SIGNAL |
| DIFFERENTIAL SIGNAL | Utility + DIFFERENTIAL SIGNAL | HPD − DIFFERENTIAL SIGNAL |
| DIFFERENTIAL SIGNAL + IN-PHASE SIGNAL | Utility + DIFFERENTIAL SIGNAL + IN-PHASE SIGNAL | HPD − DIFFERENTIAL SIGNAL + IN-PHASE SIGNAL |

INTERFACE CIRCUIT AND INFORMATION PROCESSING SYSTEM

CROSS REFERENCE TO RELATED APPLICATIONS

The present application is a continuation application of U.S. patent application Ser. No. 16/249,264, filed on Jan. 16, 2019, which is a continuation of U.S. patent application Ser. No. 15/314,308, filed on Nov. 28, 2016, now U.S. Pat. No. 10,218,488, which is a National Stage Entry of Patent Application No. PCT/JP2015/058880 filed on Mar. 24, 2015, which claims priority from prior Japanese Patent Application 2014-121641 filed in the Japan Patent Office on Jun. 12, 2014, the entire contents of which are hereby incorporated by reference.

TECHNICAL FIELD

The present technology relates to an interface circuit. In detail, this relates to the interface circuit for transmitting a digital signal such as an audio signal and a video signal between devices and an information processing system.

BACKGROUND ART

Recently, along with popularization of an audio/visual (AV) device which handles a digital signal such as an audio signal and a video signal, various types of interfaces for transmitting the digital signal between the AV devices are suggested. As such interface, the Institute of Electrical and Electronics Engineers (IEEE) 1394 standard, the High-Definition Multimedia Interface (HDMI)™ standard are widely known. In such interface, technology of transmitting the audio signal in a direction opposite to a transmitting direction of a main large-capacity channel is known. For example, an interface circuit which transmits a biphase modulation signal referred to as SPDIF in a direction opposite to a transmitting direction of a serial transmission path referred to as TMDS is suggested in the HDMI standard (for example, refer to Patent Document 1).

CITATION LIST

Patent Document

Patent Document 1: Japanese Patent Application Laid-Open No. 2009-130606

SUMMARY OF THE INVENTION

Problems to be Solved by the Invention

However, the biphase modulation signal of SPDIF supposes the transmission of the audio signal of substantially approximately 3 Mbps, so that this is not suitable for the transmission of a high-quality audio signal such as so-called High-Bitrate Audio (HBR). If the biphase modulation signal is transmitted at a high speed, since this is an in-phase signal at a fixed bit rate, unnecessary radiation is generated and this might affect another signal in a cable.

The present technology is achieved in view of such a circumstance and an object thereof is to transmit the signal at a high speed in the direction opposite to the transmitting direction of the main large-capacity channel.

Solutions to Problems

The present technology is achieved for solving the above-described problem and a first aspect thereof is an interface circuit provided with a first transmitting unit which transmits a first signal including a clock component to an external device through a transmission path as a differential signal, a second transmitting unit which superimposes a second signal including a clock component on the transmission path as an in-phase signal to transmit to the external device, and a state notifying unit which communicates with the external device through a pair of differential transmission paths included in the transmission path and notifies the external device of a connection state of its own device by a DC bias potential of at least one of the pair of differential transmission paths. According to this, there is an effect of superimposing the first signal transmitted by differential transmission and the second signal transmitted by in-phase transmission on the same transmission path to transmit the first and second signals.

Also, in the first aspect, the above-described first signal may be an audio signal. An MLT-3 method and an NRZ method are supposed, for example, as modulation at the time of transmission.

Also, the first aspect may be further provided with a communication unit which performs communication for encrypting and decrypting the first signal with the external device through a second transmission path different from the transmission path. According to this, there is an effect of transmitting an encrypted first signal. Also, a utility line and a hot plug detect line forming an HDMI cable may be used as the above-described transmission path, and a display data channel forming the HDMI cable may be used as the above-described second transmission path.

Also, a second aspect of the present technology is an interface circuit provided with a first transmitting unit which transmits a first signal including a clock component to an external device through a transmission path as a differential signal, a second transmitting unit which superimposes a second signal for decrypting the first signal on the transmission path as an in-phase signal to transmit the superimposed signal to the external device, and a state notifying unit which communicates with the external device through a pair of differential transmission paths included in the transmission path and notifies the external device of a connection state of its own device by a DC bias potential of at least one of the pair of differential transmission paths. According to this, there is an effect of superimposing the first signal transmitted by differential transmission and the second signal for decrypting the first signal transmitted by in-phase transmission on the same transmission path to transmit the superimposed signal.

Also, in the second aspect, the above-described first signal may be an audio signal. Also, a utility line and a hot plug detect line forming an HDMI cable may be used as the transmission path.

Also, a third aspect of the present technology is an interface circuit provided with a first receiving unit which extracts a first signal including a clock component from a differential signal received from an external device through a transmission path, a second receiving unit which extracts a second signal including a clock component from an in-phase signal received from the external device through the transmission path, and a state receiving unit which communicates with the external device through a pair of differential transmission paths included in the transmission path and is notified by the external device of a connection state by a DC bias potential of at least one of the pair of differential transmission paths. According to this, there is an effect of receiving the first signal transmitted by differential transmission and the second signal transmitted by in-phase transmission through the same transmission path.

Also, in the third aspect, the above-described first signal may be an audio signal.

Also, the third aspect may be further provided with a communication unit which performs communication for encrypting and decrypting the first signal with the external device through a second transmission path different from the transmission path. According to this, there is an effect of receiving an encrypted first signal. Also, a utility line and a hot plug detect line forming an HDMI cable may be used as the above-described transmission path, and a display data channel forming the HDMI cable may be used as the above-described second transmission path.

Also, a fourth aspect of the present technology is an interface circuit provided with a first receiving unit which extracts a first signal including a clock component from a differential signal received from an external device through a transmission path, a second receiving unit which extracts a second signal for decrypting the first signal from an in-phase signal received from the external device through the transmission path, and a state receiving unit which communicates with the external device through a pair of differential transmission paths included in the transmission path and is notified by the external device of a connection state by a DC bias potential of at least one of the pair of differential transmission paths. According to this, there is an effect of receiving the first signal transmitted by differential transmission and the second signal for decrypting the first signal transmitted by in-phase transmission through the same transmission path.

Also, in the fourth aspect, the above-described first signal may be an audio signal. Also, a utility line and a hot plug detect line forming an HDMI cable may be used as the transmission path.

Also, a fifth aspect of the present technology is an information processing system obtained by connecting a first interface circuit and a second interface circuit to each other through a transmission path, wherein the first interface circuit is provided with a first transmitting unit which transmits a first signal including a clock component to the second interface circuit through the transmission path as a differential signal, a second transmitting unit which superimposes a second signal including a clock component on the transmission path as an in-phase signal to transmit the superimposed signal to the second interface circuit, and a state notifying unit which communicates with the second interface circuit through a pair of differential transmission paths included in the transmission path and notifies the second interface circuit of a connection state of the first interface circuit by a DC bias potential of at least one of the pair of differential transmission paths, and the second interface circuit is provided with a first receiving unit which extracts the first signal including the clock component from the differential signal received from the first interface circuit through the transmission path, a second receiving unit which extracts the second signal including the clock component from the in-phase signal received from the first interface circuit through the transmission path, and a state receiving unit which communicates with the first interface circuit through the pair of differential transmission paths included in the transmission path and is notified by the first interface circuit of the connection state by the DC bias potential of at least one of the pair of differential transmission paths. According to this, there is an effect of superimposing the first signal transmitted by differential transmission and the second signal transmitted by in-phase transmission on the same transmission path to transmit and receive.

Effects of the Invention

According to the present technology, an excellent effect that a signal may be transmitted at a high speed in a direction opposite to a transmitting direction of a main large-capacity channel may be obtained. Meanwhile, the effect is not necessarily limited to that herein described and may be any effect described in this disclosure.

BRIEF DESCRIPTION OF DRAWINGS

FIG. 2 is a view illustrating a pin arrangement example of a connector conforming to the HDMI standard.

FIG. 5 is a view illustrating an outline of operation in the embodiment of the present technology.

MODE FOR CARRYING OUT THE INVENTION

Modes for carrying out the present technology (hereinafter, referred to as embodiments) are hereinafter described. The description is given in the following order.
1. First Embodiment (Example of Transmitting Signal in Opposite Direction)
2. Second Embodiment (Example of Transmitting Key for Copyright Protection)
3. Third Embodiment (Example of Transmitting Clock Signal by In-phase Signal)
4. Application Example 1. First Embodiment

[Interface Conforming to HDMI Standard]

Figure 1:
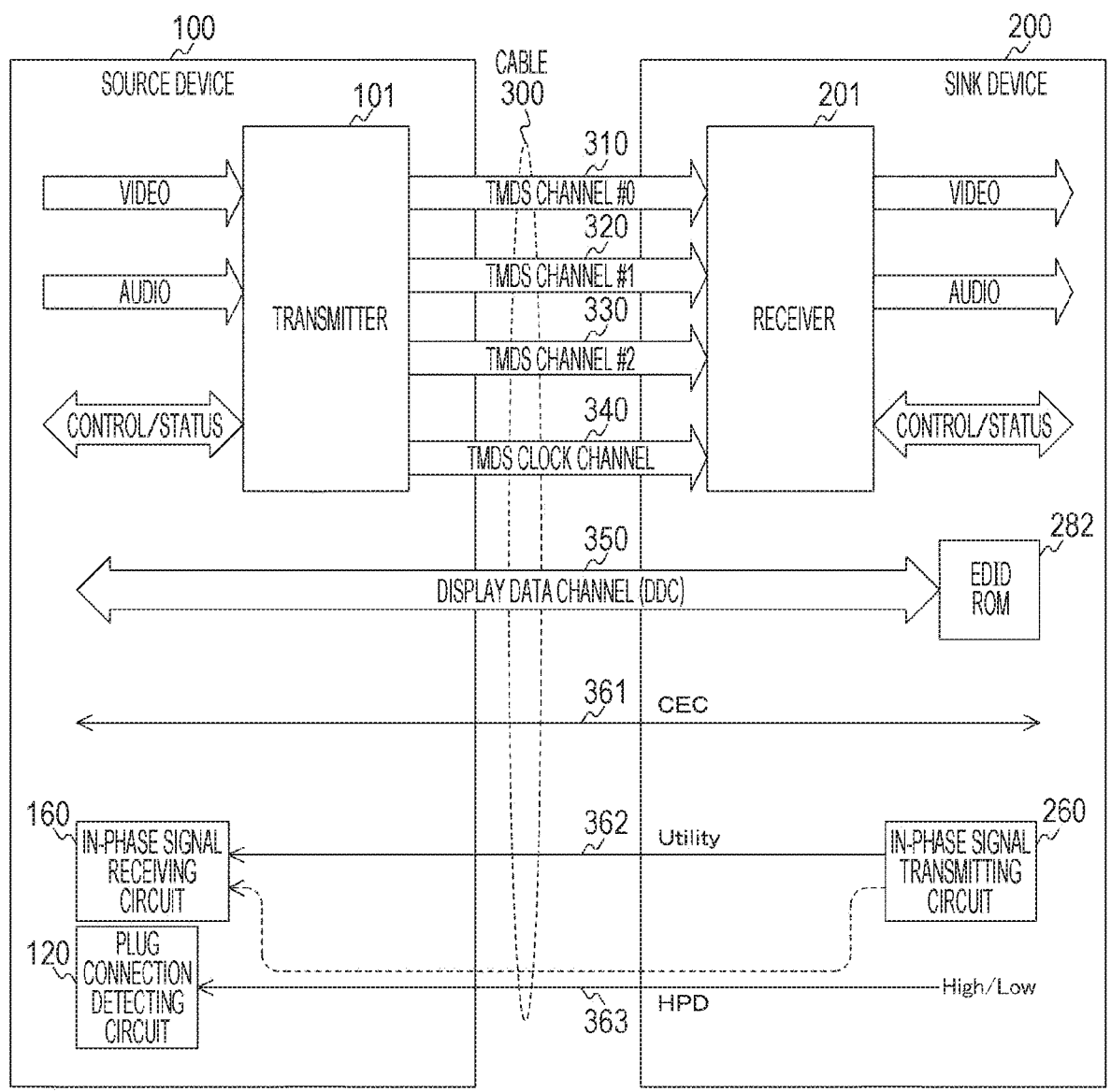
FIG. 1 is a schematic configuration diagram of an interface conforming to the HDMI standard.

FIG. 1 is a schematic configuration diagram of an interface conforming to the HDMI standard. In the HDMI standard, a transmitting direction by a basic high-speed transmission line is determined in one direction; a device on a transmission side is referred to as a source device and a device on a reception side is referred to as a sink device. In this example, a source device 100 and a sink device 200 are connected to each other through an HDMI cable 300. Then, the source device 100 includes a transmitter 101 which performs transmitting operation and the sink device 200 includes a receiver 201 which performs receiving operation.

A serial transmission method referred to as transition minimized differential signaling (TMDS) is used for transmission between the transmitter 101 and the receiver 201. In the HDMI standard, a video signal and an audio signal are transmitted by using three TMDS channels 310 to 330. That is to say, in an active image section being a section obtained by removing a horizontal blanking interval and a vertical blanking interval from a section from a certain vertical synchronization signal to a next vertical synchronization signal, a differential signal corresponding to uncompressed pixel data of one-screen image is unidirectionally transmitted toward the sink device 200 through the TMDS channels 310 to 330. Also, in the horizontal blanking interval or the vertical blanking interval, differential signals corresponding to audio data, control data, other auxiliary data and the like are unidirectionally transmitted toward the sink device 200 through the TMDS channels 310 to 330.

Also, in the HDMI standard, a clock signal is transmitted through a TMDS clock channel 340. In each of the TMDS channels 310 to 330, 10-bit pixel data may be transmitted during one clock transmitted through the TMDS clock channel 340.

Also, in the HDMI standard, a display data channel (DDC) 350 is provided. The display data channel 350 is essentially used in order for the source device 100 to read E-EDID information stored in an EDID ROM 282 in the sink device 200. When the sink device 200 is a display device, the enhanced extended display identification data (E-EDID) information indicates information regarding setting and performance such as a model, resolution, a color characteristic, and timing. The E-EDID information is maintained in the EDID ROM 282 of the sink device 200.

Furthermore, in the HDMI standard, a consumer electronics control (CEC) line 361, a utility line 362, a hot plug detect (HPD) line 363 and the like are provided. The CEC line 361 is a line for performing bidirectional communication of a device control signal. Although the display data channel 350 connects the devices on a one-to-one basis, the CEC line 361 is shared by all the devices connected to the HDMI for performing communication.

The HPD line 363 is a line for detecting connection to another device through the HDMI cable (hot plug). In the HDMI 1.4 standard, an audio return channel (ARC) to transmit an audio signal as an in-phase signal from the sink device 200 to the source device 100 by using the utility line 362 and the HPD line 363 is defined. In an embodiment of the present invention, the audio signal is transmitted as the differential signal for transmitting a high-quality audio signal from the sink device 200 to the source device 100 at a higher speed by using the utility line 362 and the HPD line 363.

An audio format standardized by the International Electrotechnical Commission (IEC) and the like is extended to a 1536 KHz frame rate. A data rate thereof is 49.152 Mbps at the maximum. On the other hand, an HEC channel by the utility line 362 and the HPD line 363 defined in the HDMI 1.4 standard correspond to transmission of a 100Base-T signal and a transmission speed thereof is 125 Mbps. Therefore, transmission at a maximum data rate of audio currently supposed may be performed by using this transmission path.

FIG. 2 is a view illustrating a pin arrangement example of a connector conforming to the HDMI standard. Herein, correspondence relationship between a pin number 301 and a signal name 302 in pin arrangement referred to as a type A is illustrated.

Each of the TMDS channels 310 to 330 and the TMDS clock channel 340 is formed of three pins of a positive electrode, a shield, and a negative electrode; pins 1 to 3, pins 4 to 6, pins 7 to 9, and pins 10 to 12 correspond to the TMDS channels 330, 320, and 310 and the TMDS clock channel 340, respectively.

Also, pins 13, 14, and 19 correspond to the CEC line 361, the utility line 362, and HPD line 363, respectively. Also, the display data channel 350 is formed of three pins of serial clock (SCL), serial data (SDA), and ground (ground) to which pins 15 to 17 correspond, respectively. Meanwhile, the ground (pin 17) of the display data channel 350 is shared by ground of the CEC line 361. A pin 18 corresponds to a power-supply line (+5 V).

[Source Device and Sink Device]

Figure 3:
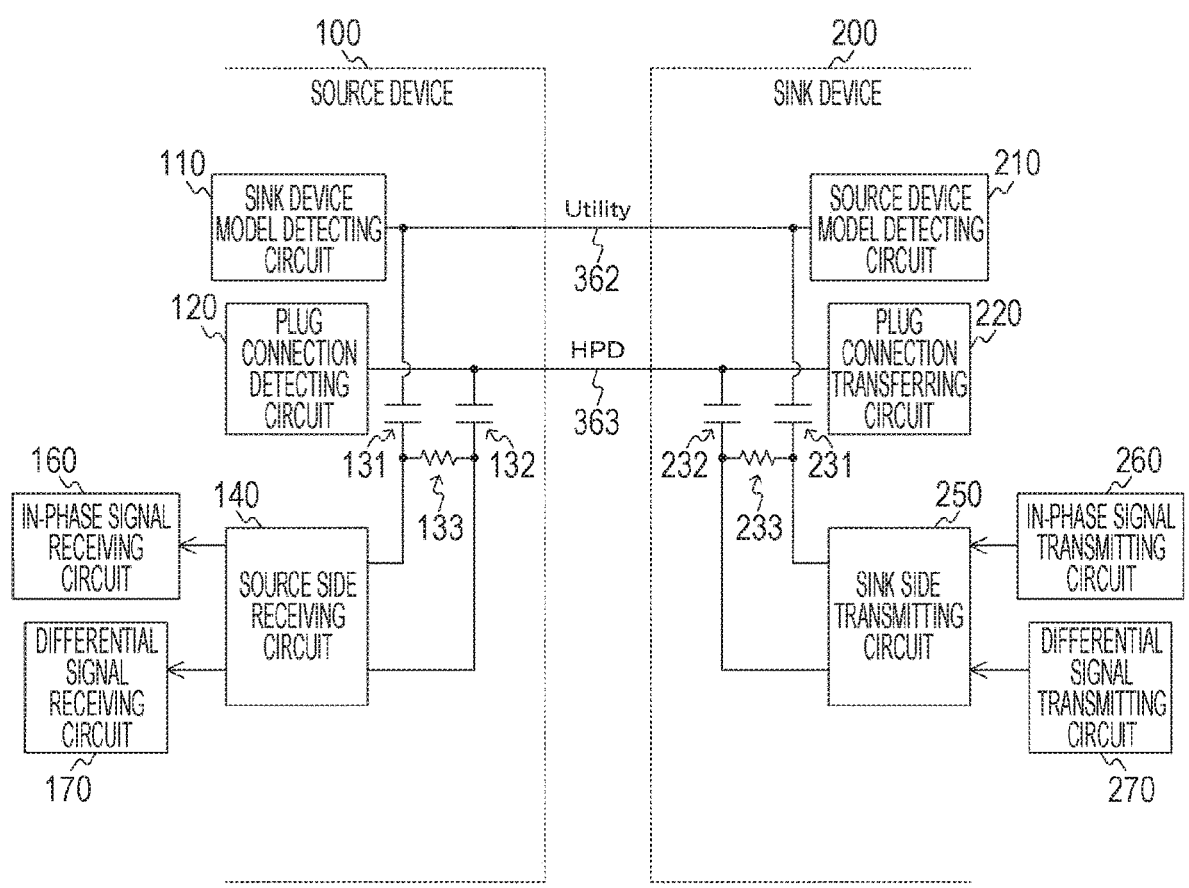
FIG. 3 is a view illustrating an internal configuration example of a source device 100 and a sink device 200 in an embodiment of the present invention.

FIG. 3 is a view illustrating an internal configuration example of the source device 100 and the sink device 200 in the embodiment of the present invention. Herein, the configuration regarding the utility line 362 and the HPD line 363 being a substantial part of the embodiment of the present technology is illustrated. The source device 100 is provided with a sink device model detecting circuit 110, a plug connection detecting circuit 120, a source side receiving circuit 140, an in-phase signal receiving circuit 160, and a differential signal receiving circuit 170. Also, the sink device 200 is provided with a source device model detecting circuit 210, a plug connection transferring circuit 220, a sink side transmitting circuit 250, an in-phase signal transmitting circuit 260, and a differential signal transmitting circuit 270.

The utility line 362 is a line used in the HDMI 1.4 standard and subsequent standards. The sink device model detecting circuit 110 in the source device 100 detects the model of the sink device 200 through the utility line 362. Also, the source device model detecting circuit 210 in the sink device 200 detects a model of the source device 100 through the utility line 362. Herein, a model configured to transmit the ARC through the utility line 362 and the HPD line 363 (hereinafter, referred to as an ARC supporting model) as in the HDMI 1.4 standard may be supposed, for example, as the model.

The HPD line 363 is the line for detecting the connection to another device through the HDMI cable as described above. The plug connection transferring circuit 220 in the sink device 200 transfers the fact that the sink device 200 is connected by biasing a terminal connected to the HPD line 363 to predetermined voltage. The plug connection detecting circuit 120 in the source device 100 compares a potential at the terminal connected to the HPD line 363 with a reference potential to detect the connection of the sink device 200.

In the embodiment of the present technology, the source side receiving circuit 140 and the sink side transmitting circuit 250 are connected to the utility line 362 and the HPD line 363 having such functions. That is to say, the source side receiving circuit 140 in the source device 100 is connected to the utility line 362 and the HPD line 363 through capacitors 131 and 132 and a resistance 133. Also, the sink side transmitting circuit 250 in the sink device 200 is connected to the utility line 362 and the HPD line 363 through capacitors 231 and 232 and a resistance 233.

The source side receiving circuit 140 connects the in-phase signal and the differential signal transmitted from the sink device 200 by using the utility line 362 and the HPD line 363 to the in-phase signal receiving circuit 160 and the differential signal receiving circuit 170, respectively.

The sink side transmitting circuit 250 connects the in-phase signal and the differential signal transmitted to the source device 100 by using the utility line 362 and the HPD line 363 to the in-phase signal transmitting circuit 260 and the differential signal transmitting circuit 270, respectively.

Meanwhile, in this embodiment, the differential signal is desirably transmitted between the sink side transmitting circuit 250 and the source side receiving circuit 140 by AC coupling.

The in-phase signal receiving circuit 160 and the in-phase signal transmitting circuit 260 perform unidirectional communication conforming to the SPDIF standard. Herein, the SPDIF standard being an interface standard for transmitting a digital audio signal in real-time is standardized as "IEC 60958" by the IEC. An SPDIF signal transmitted in the SPDIF standard is subjected to biphase-mark-modulation, so that this includes a clock component. Meanwhile, the in-phase signal receiving circuit 160 and the in-phase signal transmitting circuit 260 are realized by the conventional technology.

The differential signal receiving circuit 170 and the differential signal transmitting circuit 270 perform the unidirectional communication of the audio signal in this embodiment. As for the differential signal also, the data and the clock synchronized with the same are transmitted. An MLT-3 method and an NRZ method are supposed as for the modulation at the time of transmission.

The MLT-3 method for transmitting at three voltage levels is defined as a code with which data "0" does not change but data "1" changes. The MLT-3 method is adopted in the HEC channel in the HDMI 1.4 standard, and it is possible to transmit the differential signal in this embodiment by driving a similar physical layer with a frequency required for the audio transmission. Also, when the MLT-3 method is used, the clock may be extracted from transmission data. As with the 100Base-T, the audio signal may be subjected to Manchester coding for realizing DC free property.

The NRZ method is a method in which the potential is not returned to 0 for each bit transfer; a zero potential is obtained when the data is "0" and a positive potential is obtained when the data is "1". Although this is a simple method, coding such as 8B10B is required for realizing the DC free property and embedding clock information into the data. 8B10B is a method of embedding the clock into 8-bit data and converting to 10-bit to transfer the converted data.

Meanwhile, the in-phase signal receiving circuit 160 is an example of a second receiving unit recited in claims. Also, the differential signal receiving circuit 170 is an example of a first receiving unit recited in claims. Also, the in-phase signal receiving circuit 260 is an example of a second transmitting unit recited in claims. Also, the differential signal receiving circuit 270 is an example of a first transmitting unit recited in claims. Also, the plug connection detecting circuit 120 is an example of a state receiving unit recited in claims. Also, the plug connection transferring circuit 220 is an example of a state notifying unit recited in claims.

Figure 4A:
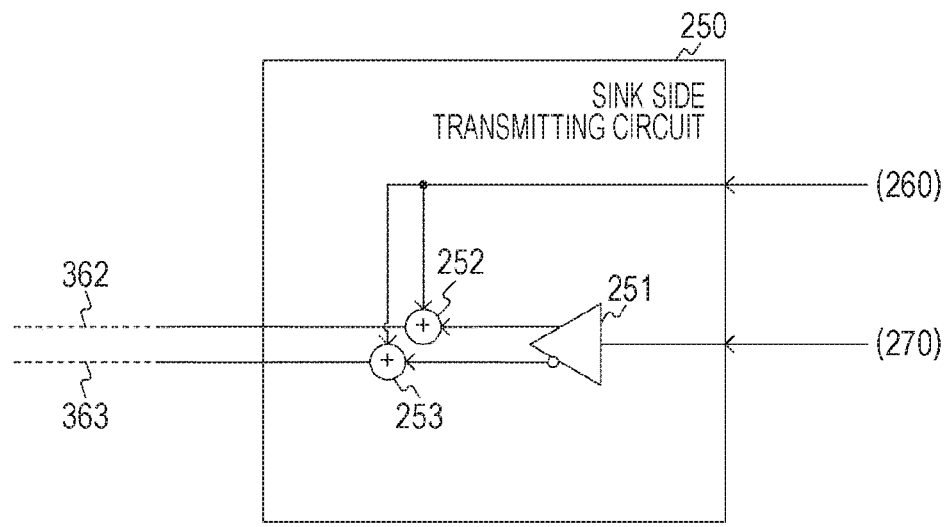
FIGS. 4A and 4B are views illustrating a configuration example of a source side receiving circuit 140 and a sink side transmitting circuit 250 in the embodiment of the present technology.
Figure 4B:
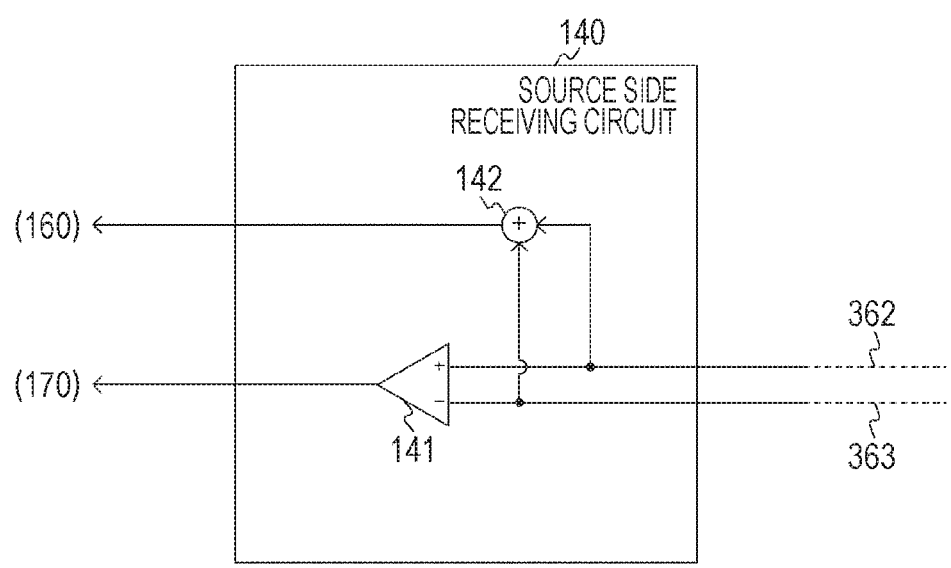

FIGS. 4A and 4B are views illustrating a configuration example of the source side receiving circuit 140 and the sink side transmitting circuit 250 in the embodiment of the present technology.

As illustrated in FIG. 4A, the sink side transmitting circuit 250 is provided with an amplifier 251 and adders 252 and 253.

The amplifier 251 is the amplifier which amplifies the signal supplied from the differential signal transmitting circuit 270. An output of the amplifier 251 is the differential signal and the signal at a positive electrode and the signal at a negative electrode are supplied to the adders 252 and 253, respectively.

The adder 252 is a circuit which adds the signal supplied from the in-phase signal transmitting circuit 260 to the positive electrode output of the amplifier 251. The adder 253 is a circuit which adds the signal supplied from the in-phase signal transmitting circuit 260 to the negative electrode output of the amplifier 251.

That is to say, the signals superimposed by the adders 252 and 253 are the in-phase signals whereas the signal output from the amplifier 251 is the differential signal. According to this, the both signals may be transmitted through the same pair of signal lines (the utility line 362 and the HPD line 363).

As illustrated in FIG. 4B, the source side receiving circuit 140 is provided with an amplifier 141 and an adder 142.

The amplifier 141 is the amplifier which amplifies the signals from the utility line 362 and the HPD line 363. The signal through the utility line 362 and the HPD line 363 is the differential signal and the amplifier 141 operates by a differential input. The adder 142 is a circuit which adds the signal at a positive electrode and the signal at a negative electrode of an output of the amplifier 141.

That is to say, out of the signals transmitted through the utility line 362 and the HPD line 363, the differential signal is extracted by the amplifier 141 and the in-phase signal is extracted by the adder 142.

FIG. 5 is a view illustrating an outline of operation in the embodiment of the present technology. As described above, the pin 14 corresponds to the utility line 362 and the pin 19 corresponds to the HPD line 363. In the device prior to the HDMI 1.4 standard, none of the in-phase signal and the differential signal is transmitted through the utility line 362 and the HPD line 363. When the in-phase signal is transmitted as in the HDMI 1.4 standard, the positive electrode signal is superimposed on the pins 14 and 19. When the differential signal is transmitted as in this embodiment, the positive electrode signal is superimposed on the pin 14 and the negative electrode signal is superimposed on the pin 19. In this embodiment, it is also possible to simultaneously transmit the in-phase signal and the differential signal.

Therefore, the in-phase signal and the differential signal may be independently transmitted through the utility line 362 and the HPD line 363, and it is possible to support a case in which both the signals are transmitted or only one of the signals is transmitted without requiring a special mechanism on a reception side (the source side receiving circuit 140).

When high-quality audio transmission from the sink device 200 side is desired by a user, the source device 100 or the sink device 200 requests activation of a transmitting function by using a command by the CEC line 361 and the like and communication by the DDC 350. For example, a case in which the user selects the function by using a remote controller of the display as the sink device 200 or selects the transmitting function by activating an audio player as the source device 100 corresponds to this. The source device 100 or the sink device 200 which receives an activation request transmits a response of whether this supports the transmitting function as the response to the activation request by a similar method in consideration of a current usage status of the TMDS channel and the like. As soon as the response to the activation request is received or the response is transmitted, both the devices change the configurations thereof to start the high-quality audio transmission. Similarly, also when the transmitting function is cancelled or stopped, it may be realized by communicating a similar command and the like.

[Model Detection]

Figure 6A:
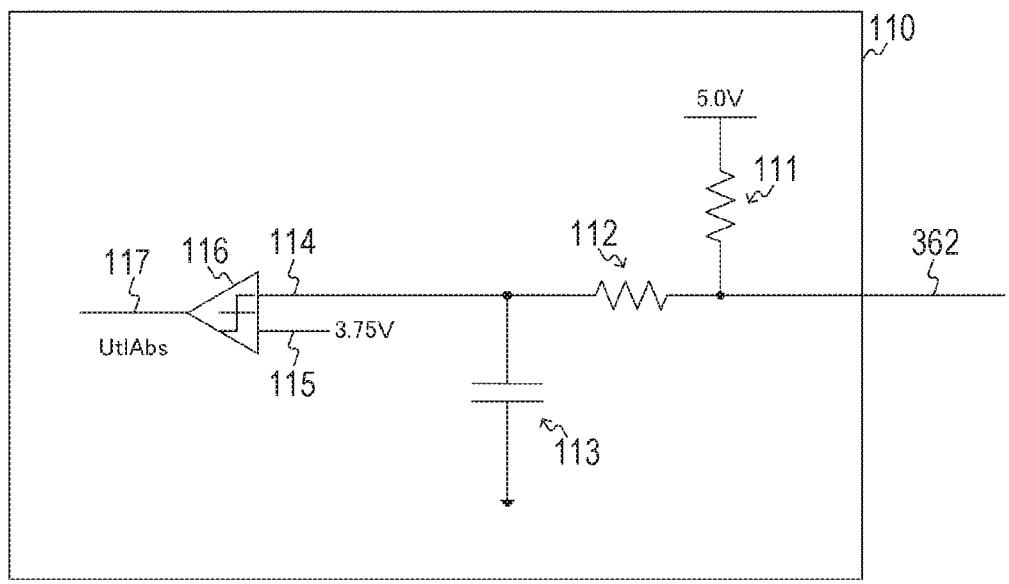
FIGS. 6A and 6B are views illustrating a configuration example of a sink device model detecting circuit 110 and a source device model detecting circuit 210 in the embodiment of the present technology.
Figure 6B:
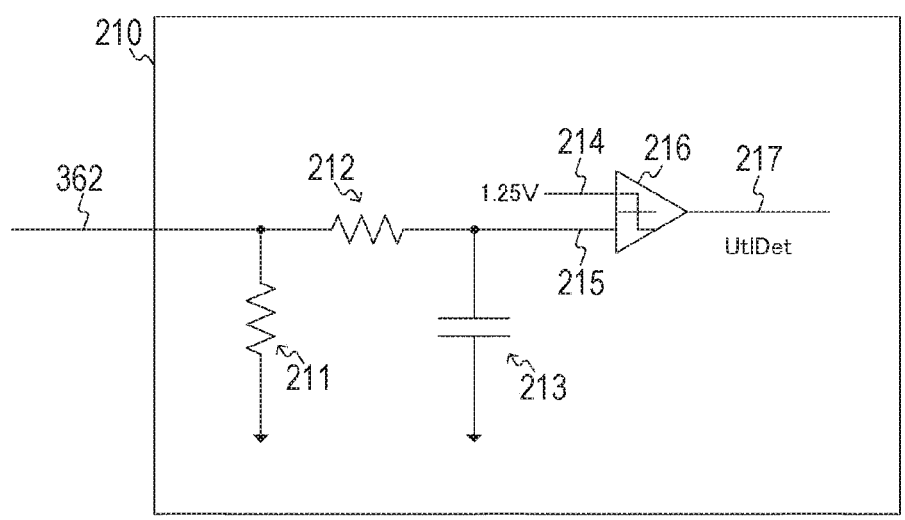

FIGS. 6A and 6B are views illustrating a configuration example of the sink device model detecting circuit 110 and the source device model detecting circuit 210 in the embodiment of the present technology.

As illustrated in FIG. 6A, the sink device model detecting circuit 110 is provided with resistances 111 and 112, a capacitor 113, and a comparator 116. The resistance 111 pulls up the utility line 362 to +5 V. The resistance 111 is present only when the source device 100 is a specific model and the pullup is not performed when the source device 100 is not the specific model. The resistance 112 and the capacitor 113 form a low-pass filter. An output of the low-pass filter is supplied to a signal line 114. The comparator 116 compares a DC potential supplied from the low-pass filter to the signal line 114 with a reference potential provided to a signal line 115.

Also, as illustrated in FIG. 6B, the source device model detecting circuit 210 is provided with resistances 211 and 212, a capacitor 213, and a comparator 216. The resistance 211 pulls down the utility line 362 to a ground potential. The resistance 211 is present only when the sink device 200 is a specific model and the pulldown is not performed when the sink device 200 is not the specific model. The resistance 212 and the capacitor 213 form a low-pass filter. An output of the low-pass filter is supplied to a signal line 215. The comparator 216 compares a DC potential supplied from the low-pass filter to the signal line 215 with a reference potential provided to a signal line 214.

When the sink device 200 is the specific model, the pulldown by the resistance 211 is performed and the potential of the utility line 362 reaches 2.5 V; when the sink device 200 is not the specific model, it is opened and 5 V is obtained. Therefore, when the reference potential of the signal line 115 is set to 3.75 V, for example, the model of the sink device 200 may be distinguished by the source device 100 on the basis of an output of a signal line 117.

Similarly, when the source device 100 is the specific model, the pullup by the resistance 111 is performed and the potential of the utility line 362 reaches 2.5 V, and when the source device 100 is not the specific model, 0 V is obtained. Therefore, when the reference potential of the signal line 214 is set to 1.25 V, for example, the model of the source device 100 may be distinguished by the sink device 200 on the basis of an output of a signal line 217.

The signal for detecting the model is transferred with a DC bias potential, so that this does not affect the in-phase signal and the differential signal transferred as AC signals.

[Connection Detection]

Figure 7A:
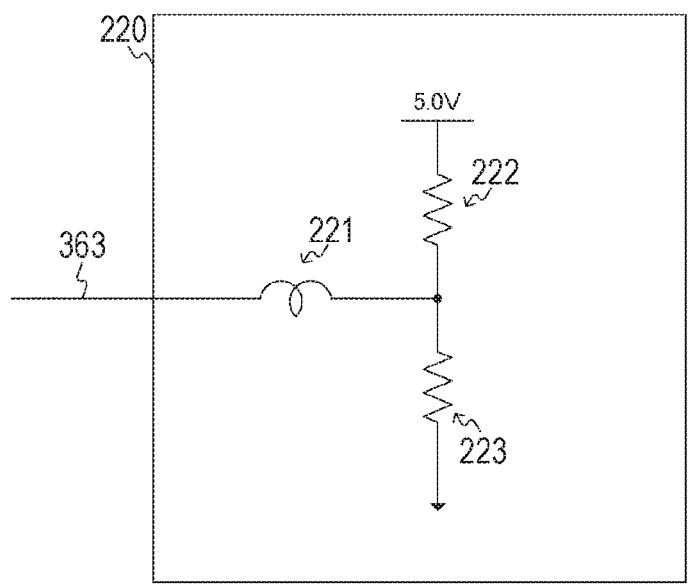
FIGS. 7A and 7B are views illustrating a configuration example of a plug connection detecting circuit 120 and a plug connection transferring circuit 220 in the embodiment of the present technology.
Figure 7B:
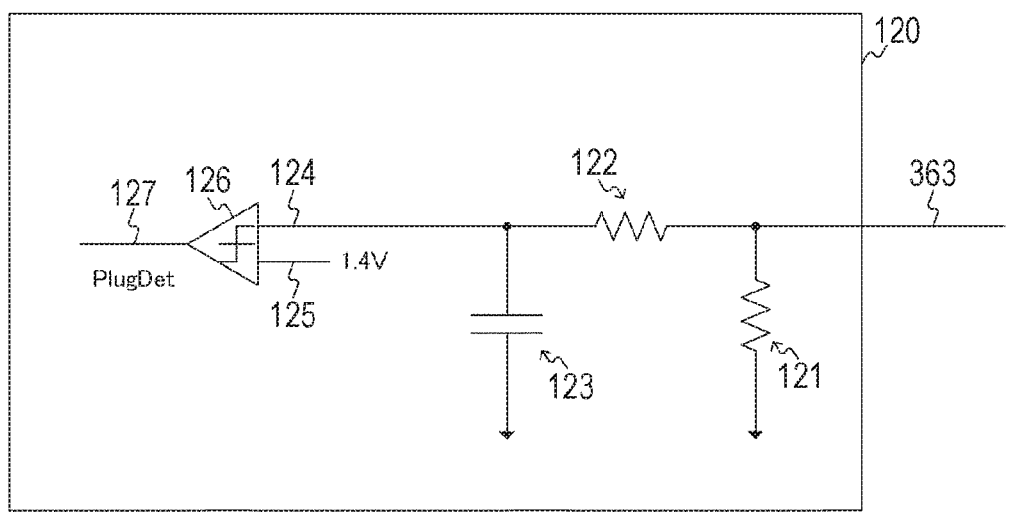

FIGS. 7A and 7B are views illustrating a configuration example of the plug connection detecting circuit 120 and the plug connection transferring circuit 220 in the embodiment of the present technology.

As illustrated in FIG. 7A, the plug connection transferring circuit 220 is provided with a choke coil 221 and resistances 222 and 223. The choke coil 221 and the resistances 222 and 223 bias the HPD line 363 to approximately 4 V, for example.

Also, as illustrated in FIG. 7B, the plug connection detecting circuit 120 is provided with resistances 121 and 122, a capacitor 123, and a comparator 126. The resistance 121 pulls down the HPD line 363 to a ground potential. The resistance 122 and the capacitor 123 form a low-pass filter. An output of the low-pass filter is supplied to a signal line 124. The comparator 126 compares a DC potential supplied from the low-pass filter to the signal line 124 with the reference potential provided to a signal line 125.

Herein, for example, 1.4 V is provided as the reference potential to the signal line 125. When the source device 100 is not connected to the HPD line 363, an input potential is pulled down by the resistance 121 and the potential of the signal line 124 becomes lower than the reference potential of the signal line 125. On the other hand, when the source device 100 is connected to the HPD line 363, since this is biased to approximately 4 V, the potential of the signal line 124 becomes higher than the reference potential of the signal line 125. Therefore, it is possible to detect whether the sink device 200 is connected by the source device 100 on the basis of an output of a signal line 127.

The signal for detecting the plug connection is transferred with the DC bias potential, so that this does not affect the in-phase signal and the differential signal transferred as the AC signals.

In this manner, according to the first embodiment of the present technology, a high-quality audio transmission path independent from the TMDS channel may be formed. Although a direction opposite to that of the TMDS channel is supposed as the ARC as the transmitting direction in the above-described embodiment, this may also be the same direction as that of the TMDS channel. In the case of the opposite direction, an ARC application supporting the high-quality audio transmission may be realized, and in the case of the same direction, a transmitting application dedicated for audio which does not require video transmission may be realized.

2. Second Embodiment

When high-quality audio transmission becomes possible in the above-described first embodiment, copyright protection is sometimes required in the transmission. In this second embodiment, a method of authentication and key exchange required for the copyright protection is described.

Figure 8:
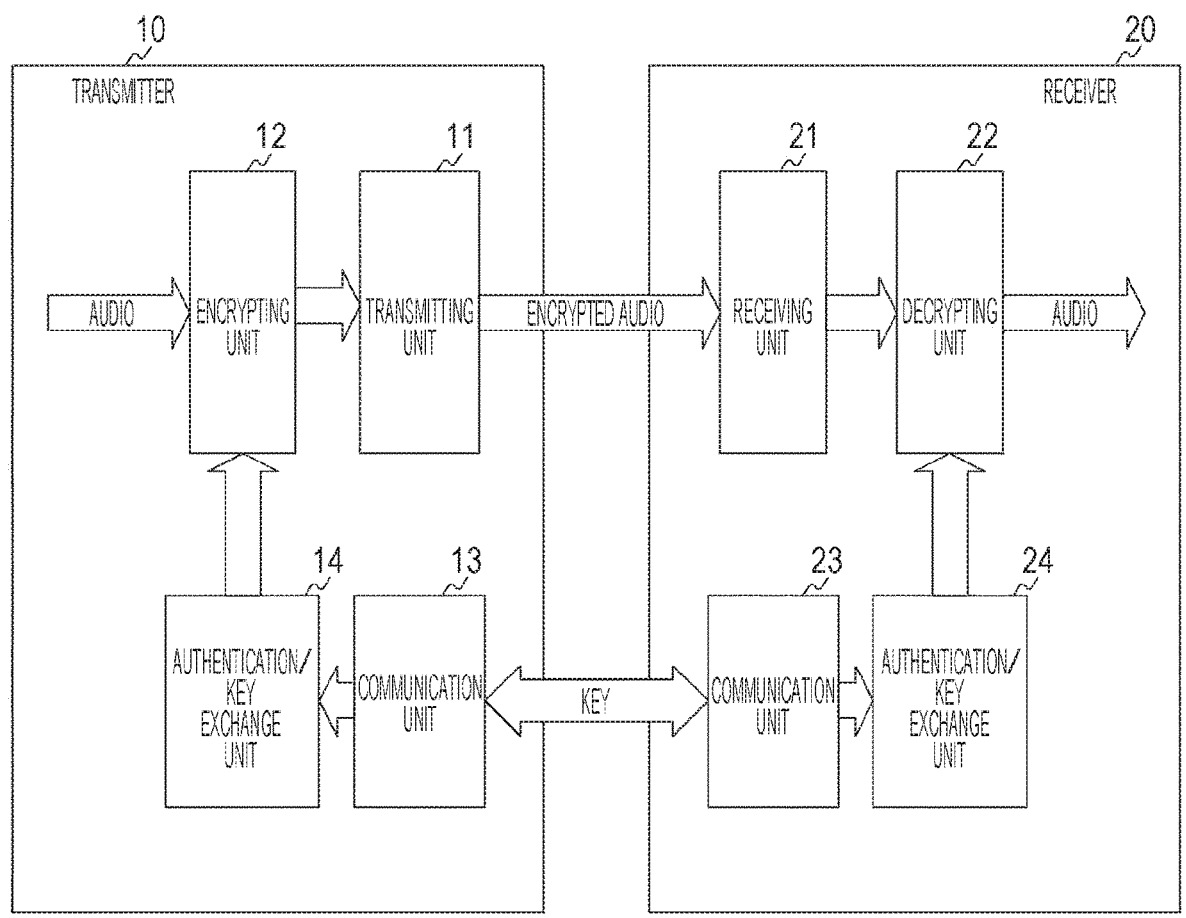
FIG. 8 is a view illustrating an outline of a copyright protection technology application system in general high-quality content transmission.

FIG. 8 is a view illustrating an outline of a copyright protection technology application system in general high-quality content transmission. The copyright protection technology application system is provided with a transmitter 10 which transmits an audio signal and a receiver 20 which receives the audio signal.

The transmitter 10 is provided with a transmitting unit 11, an encrypting unit 12, a communication unit 13, and an authentication/key exchange unit 14. The communication unit 13 performs communication for key exchange and device authentication required for encrypting the audio signal. The authentication/key exchange unit 14 authenticates a device and exchanges a key through the communication unit 13. The encrypting unit 12 encrypts the audio signal with an encryption key supplied from the authentication/key exchange unit 14. The transmitting unit 11 transmits the audio signal encrypted by the encrypting unit 12.

The receiver 20 is provided with a receiving unit 21, a decrypting unit 22, a communication unit 23, and an authentication/key exchange unit 24. The receiving unit 21 receives the encrypted audio signal transmitted from the transmitter 10. The decrypting unit 22 decrypts the encrypted audio signal received by the receiving unit 21. The communication unit 23 performs the communication for the key exchange and the device authentication required for decrypting the audio signal. The authentication/key exchange unit 24 authenticates the device and exchanges the key through the communication unit 23.

That is to say, the transmitter 10 and the receiver 20 include a bidirectional communication channel for the device authentication and the key exchange separately from a transmission path for transmitting the encrypted audio signal. The device authentication based on a private key for each device such as an RSA key pair, for example, is performed as an authentication/key exchange procedure. In a communication process, a content key is encrypted with a random number shared by the transmitter 10 and the receiver 20 and is transmitted from the former to the latter, so that the transmitter 10 and the receiver 20 share the same content key. Then, by encrypting content information by the transmitter 10 and decrypting the same by the receiver 20 by using AES encryptor and decryptor, for example, with the content key, the information is transmitted in safe. Meanwhile, the content key may be updated at a certain interval for further improving safety thereof.

Meanwhile, the communication unit 13 or 23 is an example of a communication unit recited in claims.

In the second embodiment of the present technology, the communication path for the copyright protection described above may be realized in the following manner. As a first example, a DDC 350 conforming to the HDMI standard may be used. A video signal is not transmitted through a TMDS channel while a high-quality audio signal by the embodiment of the present technology is transmitted. Therefore, the DDC 350 may be used for copyright protection information communication of this transmission. In a case of the communication in the same direction as a transmitting direction of the TMDS channel, the DDC conforming to the HDMI standard may be directly applied. In a case of the communication in a direction opposite to the transmitting direction of the TMDS channel, the communication by the DDC 350 conforming to the HDMI standard should be configured in the opposite direction. Therefore, in the second embodiment of the present technology, as described later, a DDC register generally mounted on a sink device 200 side is also mounted on a source device 100 side and the sink device 200 is allowed to operate as a master.

As a second example, there may be a method of superimposing on a utility line 362 and a HPD line 363 as an in-phase signal to communicate. Transmission of data required for the authentication is at most approximately several hundred Kbps in both directions, so that even when this is superimposed as the in-phase signal, quality of a differential signal may be maintained. According to the second example, change in the DDC 350 is not required.

An example of changing the DDC 350 to a bidirectional line is hereinafter described as the first example of the communication path for the copyright protection. As illustrated in FIG. 2, the DDC 350 is formed of three pins: serial clock (SCL), serial data (SDA), and ground (ground). A register group such as an EDID ROM 282 is provided on the sink device 200 and the register group is accessed and an SDA line is driven on the basis of timing of an SCL line.

[Bidirectional DDC]

Figure 9:
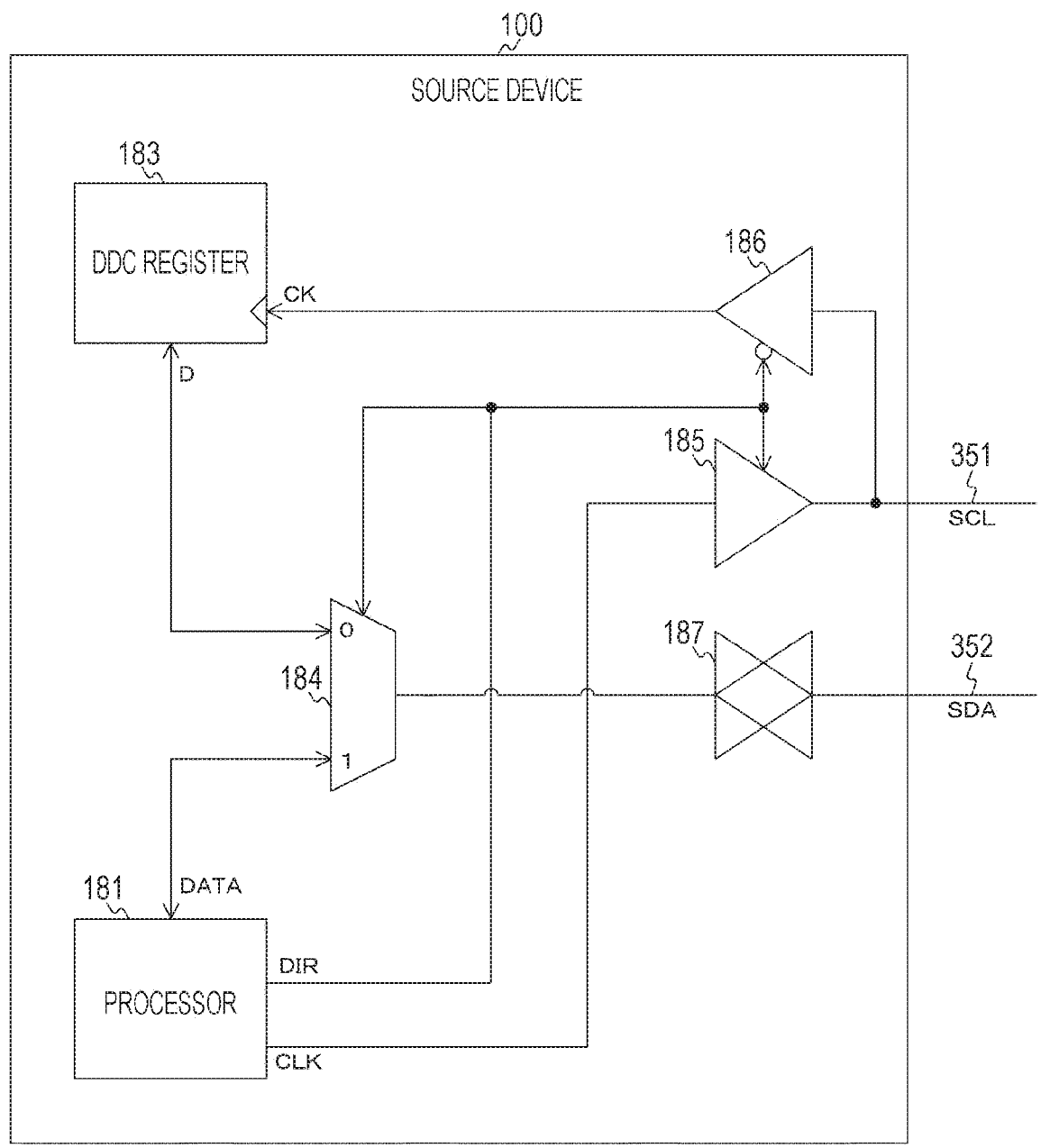
FIG. 9 is a view illustrating a configuration example of a source device 100 in a second embodiment of the present technology.
Figure 10:
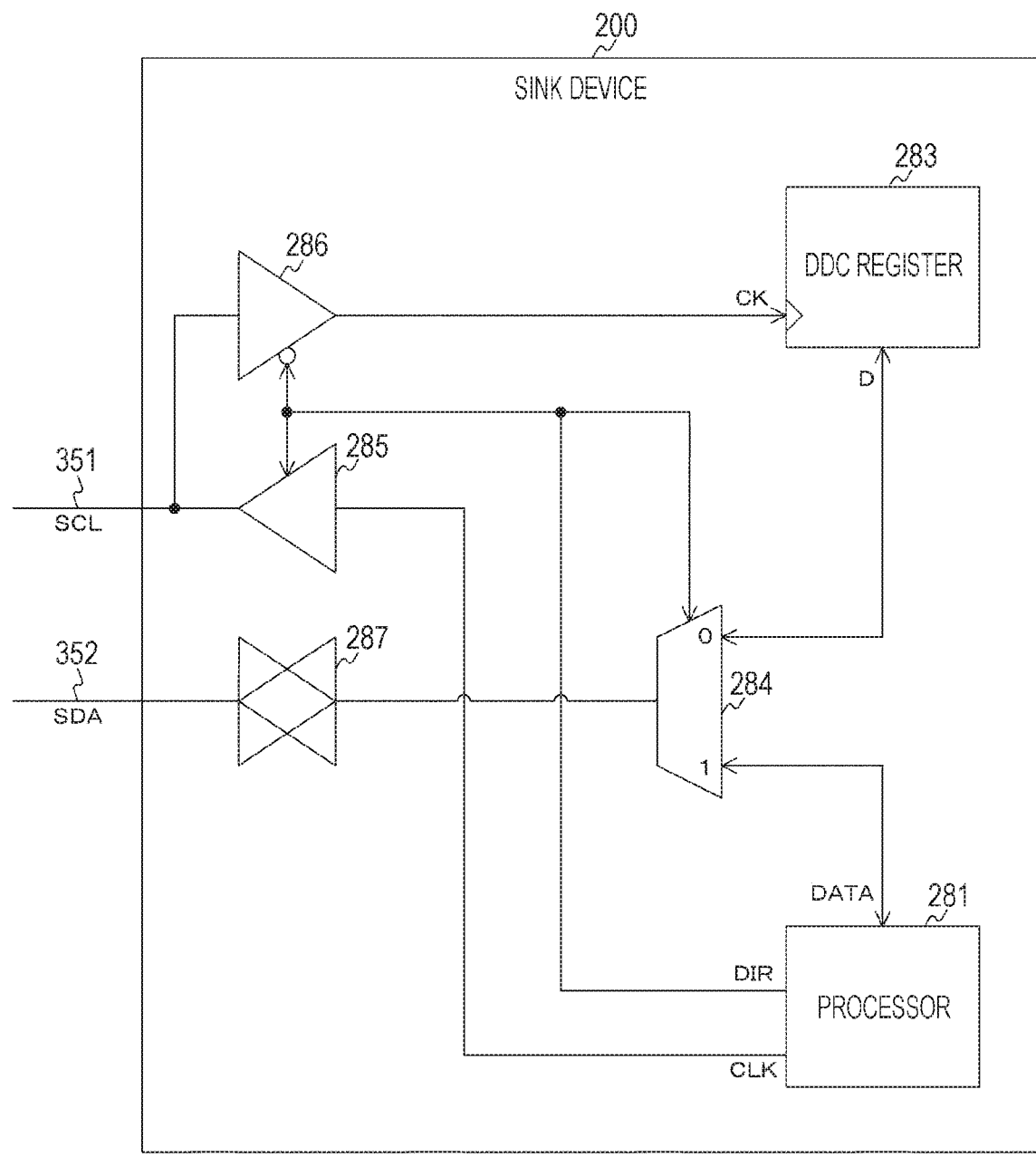
FIG. 10 is a view illustrating a configuration example of a sink device 200 in the second embodiment of the present technology.

FIG. 9 is a view illustrating a configuration example of the source device 100 in the second embodiment of the present technology. FIG. 10 is a view illustrating a configuration example of the sink device 200 in the second embodiment of the present technology. Herein, a state in which the source device 100 and the sink device 200 are connected to each other through an SCL line 351 and an SDA line 352 is illustrated. Meanwhile, a ground line is not herein illustrated.

The source device 100 is provided with a processor 181, a DDC register 183, a selector 184, and drivers 185 to 187. Similarly, the sink device 200 is provided with a processor 281, a DDC register 283, a selector 284, and drivers 285 to 287.

When the data is transmitted from the source device 100 to the sink device 200, the source device 100 serves as a master and "1" is output as a transmitting direction signal DIR from the processor 181. According to this, the driver 185 operates and an output of the driver 186 is put into a high-impedance state. Therefore, a clock signal CLK from the processor 181 is output to the SCL line 351. Also, the selector 184 selects a data signal DATA from the processor 181. Therefore, the data signal DATA is output to the SDA line 352 through the driver 187.

In this case, the sink device 200 serves as a slave and "0" is output as the transmitting direction signal DIR from the processor 281. According to this, the driver 286 operates and an output of the driver 285 is put into a high-impedance state. Therefore, a value of the SCL line 351 is input to the DDC register 283 as a clock signal CK. Also, the selector 284 connects a value of the SDA line 352 to the DDC register 283 as a data signal D. Therefore, the DDC register 283 maintains or outputs the data signal D according to the clock signal CK.

On the other hand, when the data is transmitted from the sink device 200 to the source device 100, the sink device 200 serves as the master and "1" is output from the processor 281 as the transmitting direction signal DIR. Also, in this case, the source device 100 serves as the slave and "0" is output as the transmitting direction signal DIR from the processor 181. That is to say, the source device 100 and the sink device 200 operate inversely with the above-described case. Meanwhile, when switching the transmitting direction, it is required that change in configuration is known by both the source device 100 and the sink device 200 as described above.

In this manner, the DDC 350 is allowed to perform bidirectional communication, so that the information required for the copyright protection may be communicated between the source device 100 and the sink device 200.

[Authentication and Key Exchange Procedure]

Figure 11:
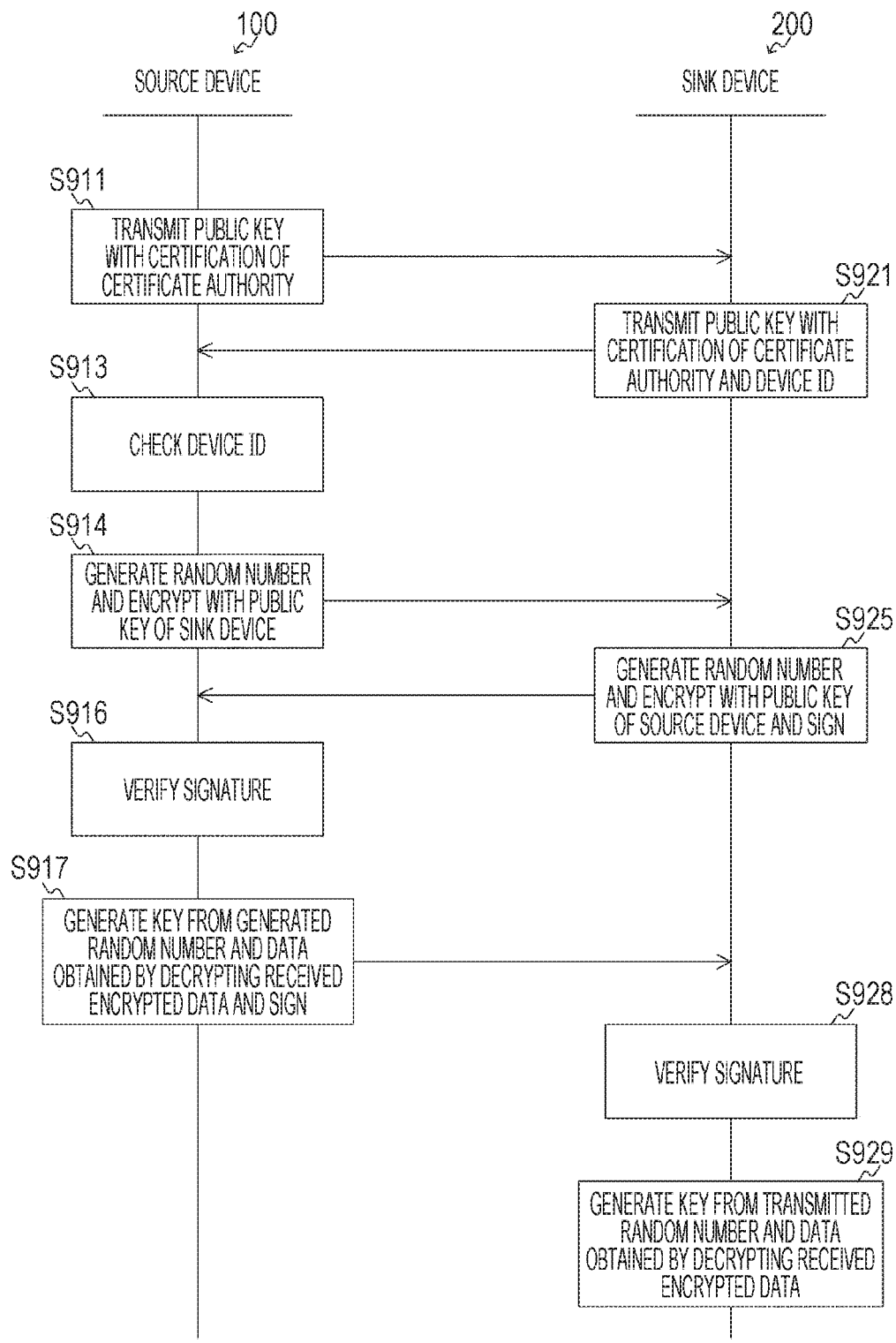
FIG. 11 is a sequence diagram illustrating an example of an authentication and key exchange procedure in the second embodiment of the present technology.

FIG. 11 is a sequence diagram illustrating an example of the authentication and key exchange procedure in the second embodiment of the present technology.

The source device 100 first transmits a public key of the source device 100 to which a certification by a certification authority is assigned to the sink device 200 (S911). The sink device 200 which receives the public key of the source device 100 transmits a public key of the sink device 200 to which a certification by the certification authority is assigned and a device ID to the source device 100 (S921).

The source device 100 which receives the public key and the device ID of the sink device 200 checks whether the device does not fall under an invalid device with reference to the device ID (S913). When this falls under the invalid device, the procedure stops. When this does not fall under the invalid device, the source device 100 generates a random number, encrypts the random number with the public key of the sink device 200, and transmits the same to the sink device 200 (S914).

The sink device 200 generates a random number and encrypts the random number with the public key of the source device 100. Then, the sink device 200 signs both encrypted data received from the source device 100 and encrypted data encrypted by itself and transmits the encrypted data encrypted by itself and signature data to the source device 100 (S925).

The source device 100 verifies the signature data received from the sink device 200 (S916). Herein, when the signature is not correct, the procedure stops. When the signature is correct, both the encrypted data received from the sink device 200 and the encrypted data encrypted by itself are signed and transmitted to the sink device 200. Then, a key is generated from the random number transmitted by the source device 100 itself and the data obtained by decrypting the encrypted data received from the sink device 200 (S917).

The sink device 200 verifies signature data received from the source device 100 (S928). Herein, when the signature is not correct, the procedure stops. When the signature is correct, a key is generated from the random number transmitted by the sink device 200 itself and the data obtained by decrypting the encrypted data received from the source device 100 (S929).

The keys generated by both the source device 100 and the sink device 200 in this manner are used for encrypting and decrypting the audio signal.

In this manner, according to the second embodiment of the present technology, the high-quality audio transmission may be realized in a state in which the copyright is protected.

3. Third Embodiment

The audio signal including a clock component is transmitted as the different signal from the sink device 200 to the source device 100 by using the utility line 362 and the HPD line 363 in the above-described first embodiment. On the other hand, in this third embodiment, an audio signal is transmitted as a differential signal but a clock signal of the audio signal is transmitted as an in-phase signal. Meanwhile, a basic configuration is similar to that of the first embodiment, so that the detailed description thereof is omitted.

In the third embodiment, a word clock of the audio signal may be used as the clock signal. Also, in a case of a high-speed word clock, a basic clock thereof may be used. As a frequency of the basic clock, 32 KHz, 44.1 KHz, or 48 KHz are supposed, for example. When the basic clock is used, an actual word clock is a multiple thereof. However, a signal at a sufficiently low speed is desired for inhibiting unnecessary radiation.

The clock signal by the in-phase signal is transmitted in the same direction as that of the audio signal, so that a reproduced clock may be easily generated on a reception side. Meanwhile, a clock for high-quality reproduction synchronized with a master clock on the reception side may also be obtained by transmitting the clock signal by the in-phase signal from the reception side in an opposite direction.

4. Application Example

Although an application example to an interface circuit conforming to the HDMI standard is described in the above-described embodiment, the present technology may also be applied to another configuration. Herein, an application example to a disc player, a television receiver, and a digital camera is described as the application example.

Figure 12:
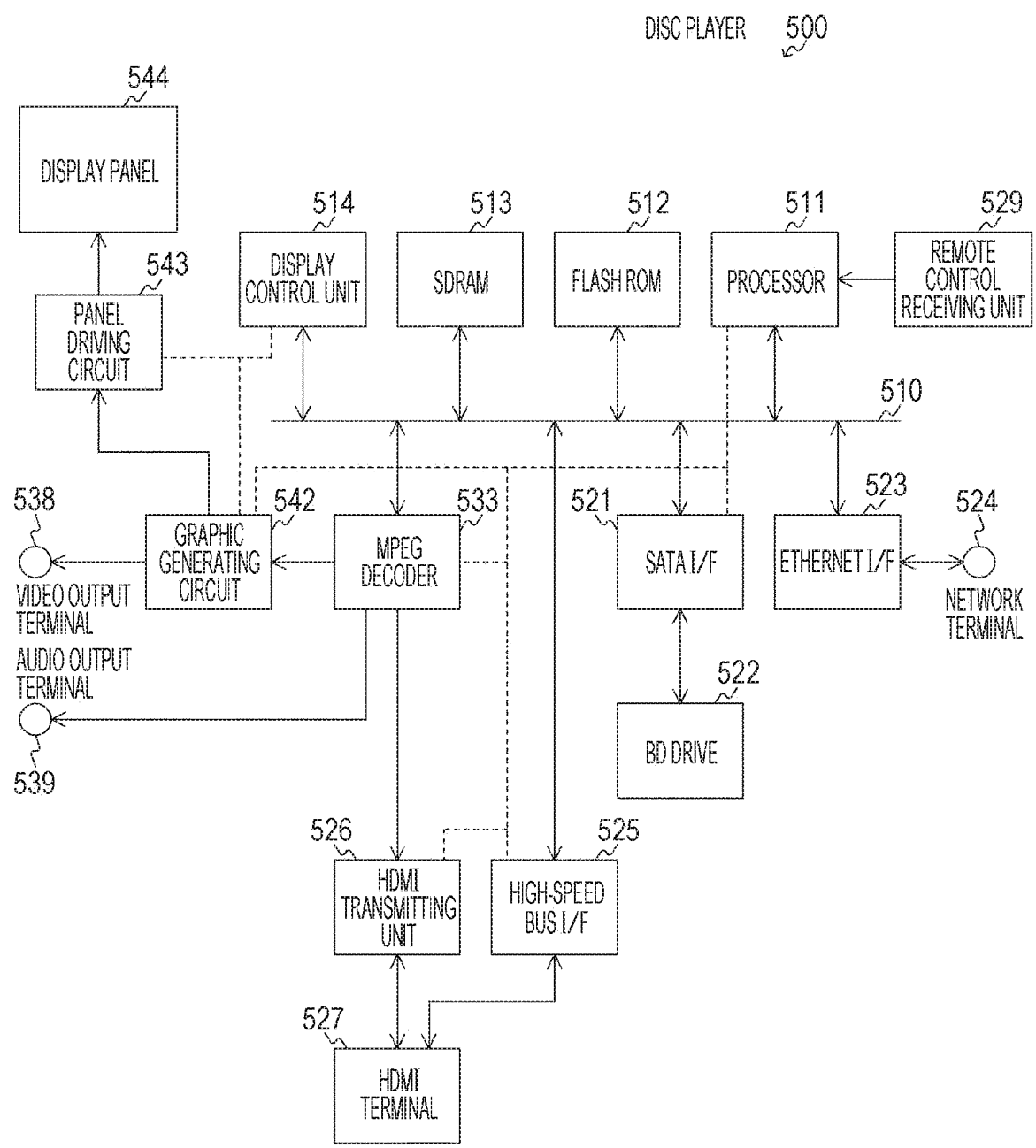
FIG. 12 is a view illustrating a configuration example of a disc player 500 in an embodiment of the present technology.

FIG. 12 is a view illustrating a configuration example of a disc player 500 in an embodiment of the present technology. The disc player 500 is provided with a processor 511, a flash ROM 512, an SDRAM 513, and a display control unit 514. The disc player 500 is also provided with a SATA interface 521, a BD drive 522, an Ethernet™ interface 523, and a network terminal 524. The disc player 500 is also provided with a high-speed bus interface 525, an HDMI transmitting unit 526, an HDMI terminal 527, and a remote control receiving unit 529. The disc player 500 is also provided with an MPEG decoder 533, a video output terminal 538, and an audio output terminal 539. The disc player 500 is also provided with a graphic generating circuit 542, a panel driving circuit 543, and a display panel 544. The processor 511, the flash ROM 512, the SDRAM 513, the display control unit 514, the SATA interface 521, the Ethernet interface 523, and the MPEG decoder 533 are connected to one another through a bus 510.

The processor 511 controls an entire disc player 500. The flash ROM 512 is a memory which stores a program and the like required for operation of the processor 511. The SDRAM 513 is a memory which stores data and the like required for the operation of the processor 511.

The SATA interface 521 is an interface for connecting serial ATA. The BD drive 522 is a disc drive for driving a Blu-Ray™ Disc. The Ethernet interface 523 is an interface for connecting the Ethernet. The network terminal 524 is a terminal for connecting the Ethernet.

The high-speed bus interface 525 is a utility line 362 and a HPD line 363 conforming to the HDMI standard. The HDMI transmitting unit 526 is a transmitting circuit for an interface conforming to the HDMI standard. The HDMI terminal 527 is a terminal conforming to the HDMI standard.

The remote control receiving unit 529 receives a signal from a remote control (not illustrated) operated by a user.

The MPEG decoder 533 is a decoder which decodes a signal conforming to the MPEG standard. The video output terminal 538 is a terminal which outputs a video signal. The audio output terminal 539 is a terminal which outputs an audio signal.

The display control unit 514 performs control required for display on the display panel 544. The graphic generating circuit 542 generates a graphic image to be displayed on the display panel 544. The panel driving circuit 543 is a circuit for driving the display panel 544. The display panel 544 is a panel for displaying video. Although the disc player 500 with the display panel 544 embedded is herein supposed, there may also be the player without the display panel 544 embedded.

The high-speed bus interface 525 is inserted between the Ethernet interface 523 and the HDMI terminal 527. The high-speed bus interface 525 transmits data to be transmitted supplied from the processor 511 from the HDMI terminal 527 to a partner device through an HDMI cable. The high-speed bus interface 525 also supplies received data received from the partner device from the HDMI cable through the HDMI terminal 527 to the processor 511.

When a content is recorded, content data to be recorded is obtained through a digital tuner (not illustrated) and through the Ethernet interface 523 or the high-speed bus interface 525. The content data is input to the SATA interface 521 and is recorded in a BD by the BD drive 522. The content data may also be recorded in a hard disc drive (HDD) (not illustrated) connected to the SATA interface 521.

When the content is reproduced, the content data (an MPEG stream) reproduced from the BD by the BD drive 522 is supplied to the MPEG decoder 533 through the SATA interface 521. The MPEG decoder 533 performs a decoding process of the reproduced content data to obtain baseband image and audio data. The image data is output to the video output terminal 538 through the graphic generating circuit 542. Also, the audio data is output to the audio output terminal 539.

Also, when the content is reproduced, the image data obtained by the MPEG decoder 533 is supplied to the panel driving circuit 543 through the graphic generating circuit 542 according to user operation and a reproduced image is displayed on the display panel 544. Also, the audio data obtained by the MPEG decoder 533 is supplied to a speaker (not illustrated) according to the user operation and audio corresponding to the reproduced image is output.

Also, when the content is reproduced, if the image and audio data obtained by the MPEG decoder 533 are transmitted through an HDMI TMDS channel, the image and audio data are supplied to the HDMI transmitting unit 526 to be packed. Then, the image and audio data are output from the HDMI transmitting unit 526 to the HDMI terminal 527.

Also, when the content is reproduced, if the content data reproduced by the BD drive 522 is transmitted to a network, the content data is output to the network terminal 524 through the Ethernet interface 523. Similarly, when the content is reproduced, if the content data reproduced by the BD drive 522 is transmitted to a bidirectional communication path of the HDMI cable, the content data is output to the HDMI terminal 527 through the high-speed bus interface 525. Herein, before outputting the image data, it is possible to encrypt the same by using copyright protection technology such as HDCP, DTCP, and DTCP+, for example, to transmit.

Figure 13:
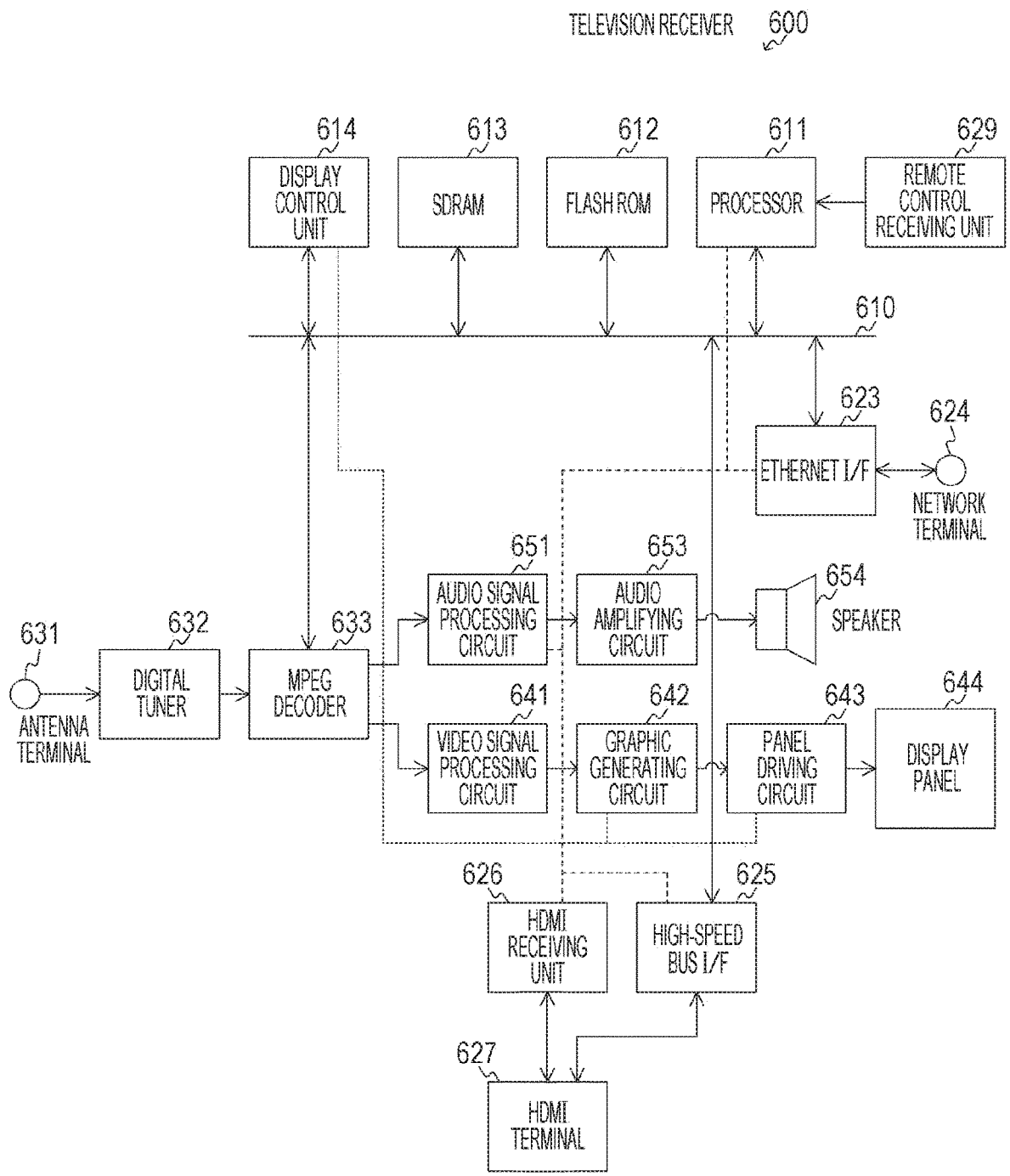
FIG. 13 is a view illustrating a configuration example of a television receiver 600 in the embodiment of the present technology.

FIG. 13 is a view illustrating a configuration example of a television receiver 600 in the embodiment of the present technology. The television receiver 600 is provided with a processor 611, a flash ROM 612, an SDRAM 613, and a display control unit 614. The television receiver 600 is also provided with an Ethernet interface 623 and a network terminal 624. The television receiver 600 is also provided with a high-speed bus interface 625, an HDMI receiving unit 626, an HDMI terminal 627, and a remote control receiving unit 629. The television receiver 600 is also provided with an antenna terminal 631, a digital tuner 632, and an MPEG decoder 633. The television receiver 600 is also provided with a video signal processing circuit 641, a graphic generating circuit 642, a panel driving circuit 643, and a display panel 644. The television receiver 600 is also provided with an audio signal processing circuit 651, an audio amplifying circuit 653, and a speaker 654. The processor 611, the flash ROM 612, the SDRAM 613, the display control unit 614, the Ethernet interface 623, the high-speed bus interface 625, and the MPEG decoder 633 are connected to one another through a bus 610.

The processor 611 controls an entire television receiver 600. The flash ROM 612 is a memory which stores a program and the like required for operation of the processor 611. The SDRAM 613 is a memory which stores data and the like required for the operation of the processor 611. The display control unit 614 performs control required for display on the display panel 644.

The Ethernet interface 623 is an interface for connecting the Ethernet. The network terminal 624 is a terminal for connecting the Ethernet. The high-speed bus interface 625 is the utility line 362 and the HPD line 363 conforming to the HDMI standard. The HDMI receiving unit 626 is a transmitting circuit for the interface conforming to the HDMI standard. The HDMI terminal 627 is a terminal conforming to the HDMI standard.

The remote control receiving unit 629 receives a signal from a remote control (not illustrated) operated by the user.

The antenna terminal 631 is a terminal for inputting a television broadcasting signal received by a receiving antenna (not illustrated). The digital tuner 632 processes the television broadcasting signal input to the antenna terminal 631 to extract a partial TS from a predetermined transport stream corresponding to a channel selected by the user.

The MPEG decoder 633 is a decoder which decodes a signal conforming to the MPEG standard. The MPEG decoder 633 performs a decoding process of a video PES packet formed of a TS packet of video data obtained by the digital tuner 632 to obtain image data. The MPEG decoder 633 also performs the decoding process of an audio PES packet formed of the TS packet of audio data obtained by the digital tuner 632 to obtain audio data.

The video signal processing circuit 641 and the graphic generating circuit 642 perform signal processing of the image data obtained by the MPEG decoder 633 or the image data received by the HDMI receiving unit 626 as needed. As the signal processing, a scaling process (resolution converting process), a superimposing process of the graphic data, gamma correction of a WCG image and the like are supposed, for example. The panel driving circuit 643 is a circuit for driving the display panel 644 on the basis of the video (image) data output from the graphic generating circuit 642. The display panel 644 is a panel for displaying video. The display panel 644 may be formed of a liquid crystal display (LCD), a plasma display panel (PDP), an organic electroluminescence (EL) panel and the like, for example.

Meanwhile, although an example in which the display control unit 614 is included in addition to the processor 611 is illustrated in this embodiment, it is also possible that the processor 611 directly controls the display on the display panel 644. Also, the processor 611 and the display control unit 614 may be formed of one chip or multiple-core.

The audio signal processing circuit 651 performs a required process such as D/A conversion of the audio data obtained by the MPEG decoder 633. The audio amplifying circuit 653 amplifies an audio signal output from the audio signal processing circuit 651 to supply to the speaker 654. Meanwhile, the speaker 654 may be a monaural speaker and a stereo speaker. Also, the number of speaker 654 may be one or two or larger. Also, the speaker 654 may be an earphone or a headphone. Also, the speaker 654 may support 2.1 channel or 5.1 channel. Also, the speaker 654 may be wirelessly connected to the television receiver 600. Also, the speaker 654 may be another device.

The television broadcasting signal input to the antenna terminal 631 is supplied to the digital tuner 632. The digital tuner 632 processes the television broadcasting signal to output a predetermined transport stream corresponding to the channel selected by the user. Then, the partial TS (the TS packet of the video data and the TS packet of the audio data) is extracted from the transport stream and the partial TS is supplied to the MPEG decoder 633.

The MPEG decoder 633 performs the decoding process of the video PES packet formed of the TS packet of the video data to obtain the video data. The video data is supplied to the panel driving circuit 643 after being subjected to the scaling process (resolution converting process), the superimposing process of the graphic data and the like as needed by the video signal processing circuit 641 and the graphic generating circuit 642. Therefore, an image corresponding to the channel selected by the user is displayed on the display panel 644.

Also, the MPEG decoder 633 performs the decoding process of the audio PES packet formed of the TS packet of the audio data to obtain the audio data. The audio data is subjected to the required process such as the D/A conversion by the audio signal processing circuit 651 and is further amplified by the audio amplifying circuit 653 to be supplied to the speaker 654. Therefore, audio corresponding to the channel selected by the user is output from the speaker 654.

Also, content data (image data and audio data) supplied from the network terminal 624 to the Ethernet interface 623 or supplied from the HDMI terminal 627 through the high-speed bus interface 625 is supplied to the MPEG decoder 633. Thereafter, the operation similar to that when the television broadcasting signal is received as described above is performed, the image is displayed on the display panel 644, and the audio is output from the speaker 654.

Also, in the HDMI receiving unit 626, the image data and the audio data transmitted from the disc player 500 connected to the HDMI terminal 627 through the HDMI cable are obtained. The image data is supplied to the video signal processing circuit 641. Also, the audio data is directly supplied to the audio signal processing circuit 651. Thereafter, the operation similar to that when the television broadcasting signal is received as described above is performed, the image is displayed on the display panel 644, and the audio is output from the speaker 654.

Figure 14:
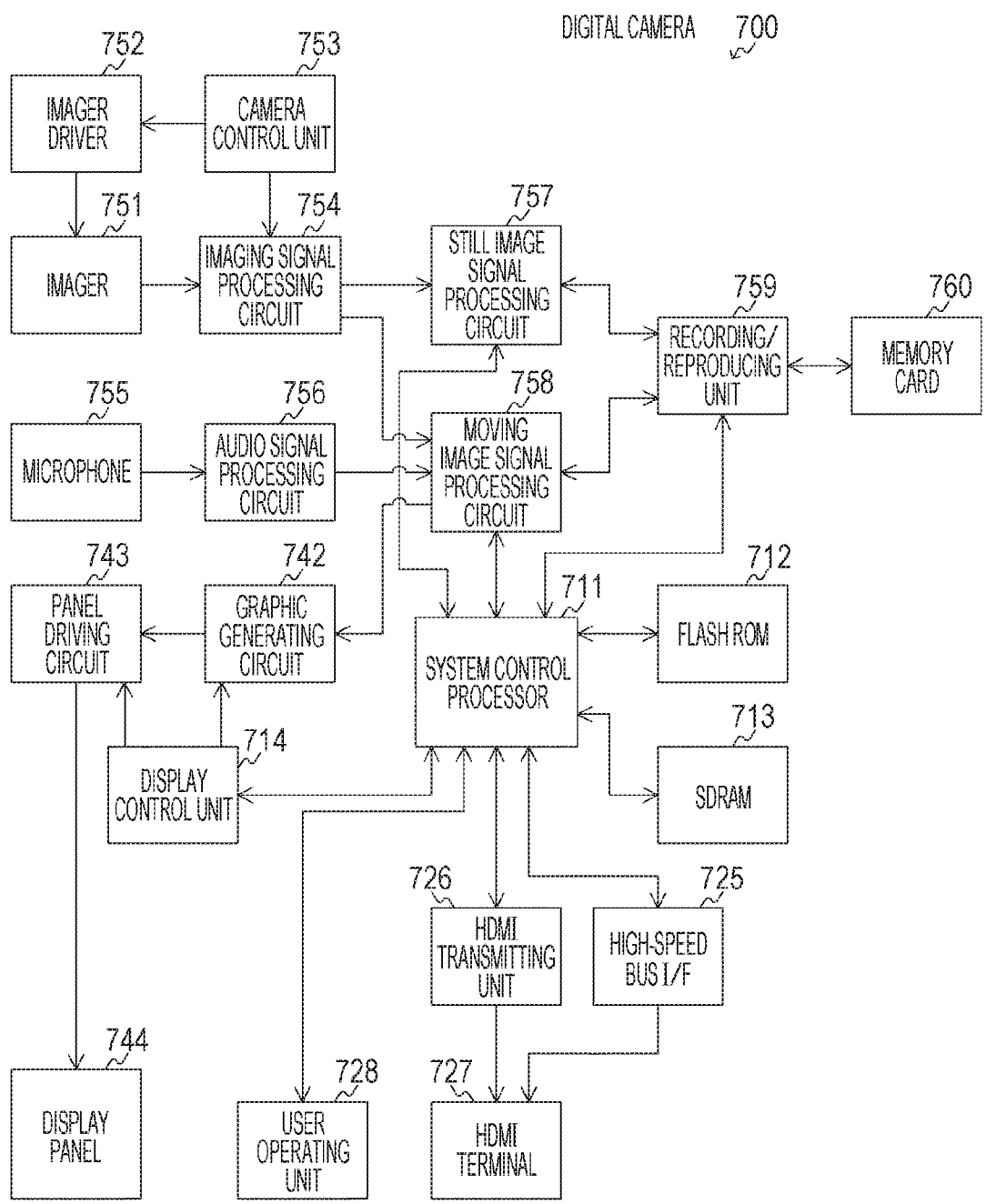
FIG. 14 is a view illustrating a configuration example of a digital camera 700 in the embodiment of the present technology.

FIG. 14 is a view illustrating a configuration example of a digital camera 700 in the embodiment of the present technology. The digital camera 700 is provided with a system control processor 711, a flash ROM 712, an SDRAM 713, and a display control unit 714. The digital camera 700 is also provided with a high-speed bus interface 725, an HDMI transmitting unit 726, an HDMI terminal 727, and a user operating unit 728. The digital camera 700 is also provided with a graphic generating circuit 742, a panel driving circuit 743, and a display panel 744. The digital camera 700 is also provided with an imager 751, an imager driver 752, and a camera control unit 753. The digital camera 700 is also provided with an imaging signal processing circuit 754, a microphone 755, an audio signal processing circuit 756, a still image signal processing circuit 757, a moving image signal processing circuit 758, a recording/reproducing unit 759, and a memory card 760.

The system control processor 711 controls an entire digital camera 700. The flash ROM 712 is a memory which stores a program and the like required for operation of the system control processor 711. The SDRAM 713 is a memory which stores data and the like required for the operation of the system control processor 711. The display control unit 714 performs control required for display on the display panel 744.

The high-speed bus interface 725 is the utility line 362 and the HPD line 363 conforming to the HDMI standard. The HDMI transmitting unit 726 is a transmitting circuit for the interface conforming to the HDMI standard. The HDMI terminal 727 is a terminal conforming to the HDMI standard.

The user operating unit 728 accepts operation from the user. The user operating unit 728 may be a switch, a wheel, a touch panel unit for inputting an instruction by approach/touch, a mouse, a keyboard, a gesture input unit which detects an input of an instruction by a camera, an audio input unit which inputs an instruction by audio, and further a remote control, for example. The system control processor 711 determines an operating state of the user operating unit 728 to control operation of the digital camera 700. The user may perform input operation and the like of various pieces of additional information in addition to imaging (recording) operation and reproducing operation by the user operating unit 728.

The graphic generating circuit 742 generates a graphic image to be displayed on the display panel 744. The panel driving circuit 743 is a circuit for driving the display panel 744. The display panel 744 is a panel for displaying video.

The imager 751 is a photoelectric conversion element which converts a received optical signal to an electric signal. The imager driver 752 is a driver which drives the imager 751. The camera control unit 753 controls the imager driver 752 and the imaging signal processing circuit 754. The imaging signal processing circuit 754 performs signal processing of the electric signal supplied from the imager 751 as the imaging signal. The microphone 755 converts ambient audio to generate an audio signal.

The audio signal processing circuit 756 performs signal processing of the audio signal generated by the microphone 755.

The still image signal processing circuit 757 performs signal processing of a still image signal supplied from the imaging signal processing circuit 754. The moving image signal processing circuit 758 performs signal processing of a moving image signal supplied from the imaging signal processing circuit 754 and the audio signal processing circuit 756.

The recording/reproducing unit 759 accesses the memory card 760, the flash ROM 712 and the like to read/write still image data or moving image data. The memory card 760 is a recording medium which records the still image data or the moving image data.

The imaging signal obtained by the imager 751 is supplied to the imaging signal processing circuit 754 to be processed and image data (captured image data) corresponding to a subject is obtained from the imaging signal processing circuit 754. When a still image is captured, the still image signal processing circuit 757 applies a compression coding process and the like to the image data output from the imaging signal processing circuit 754 and the still image data is generated. The still image data is recorded in the memory card 760 and the like by the recording/reproducing unit 759.

Also, when the moving image is captured, the moving image signal processing circuit 758 applies a compression coding process and the like conforming to a recording medium format to the image data output from the imaging signal processing circuit 754 together with the audio data output from the audio signal processing circuit 756 and the moving image data to which the audio data is added is generated. The moving image data is recorded in the memory card 760 and the like by the recording/reproducing unit 759.

When the still image is reproduced, the still image data is read from the memory card 760 and the like and is subjected to a decoding process and the like by the still image signal processing circuit 757, and reproduced image data is obtained. The reproduced image data is supplied to the panel driving circuit 743 through the system control processor 711 and the moving image signal processing circuit 758 and a still image is displayed on the display panel 744.

When the moving image is reproduced, the moving image data is read from the memory card 760 and the like by the recording/reproducing unit 759 and is subjected to a decoding process and the like by the moving image signal processing circuit 758, and reproduced image data is obtained. Then, the reproduced image data is supplied to the panel driving circuit 743 and a moving image is displayed on the display panel 744.

When the image or audio data regarding the still image data or the moving image data recorded in the memory card 760 and the like is transmitted to an external device (sink device), the still image data or the moving image data is read from the memory card 760. Then, the read still image data or moving image data is supplied to the still image signal processing circuit 757 or the moving image signal processing circuit 758 to be subjected to a decoding process and the like, and baseband image and audio data are obtained. Then, the baseband image and audio data are supplied to the HDMI transmitting unit 726 to be transmitted to an HDMI cable connected to the HDMI terminal 727.

Also, when the image or audio data regarding the still image data or the moving image data directly output from the imaging signal processing circuit 754 or the audio signal processing circuit 756 is transmitted to the external device (sink device), this is supplied to the HDMI transmitting unit 726. Then, this is transmitted to the HDMI cable connected to the HDMI terminal 727.

Meanwhile, the above-described embodiment describes an example of embodying the present technology, and there is a correspondence relationship between items in the embodiment and the matters specifying the invention in claims. Similarly, there is a correspondence relationship between the matters specifying the invention in claims and the items in the embodiment of the present technology having the same name. However, the present technology is not limited to the embodiment and may be embodied with various modifications of the embodiment without departing from the spirit thereof.

The procedures described in the above-described embodiment may be considered as a method having a series of procedures and may be considered as a program for allowing a computer to execute the series of procedures and a recording medium which stores the program. A compact disc (CD), a mini disc (MD), a digital versatile disc (DVD), a memory card, a Blu-Ray™ Disc and the like may be used, for example, as the recording medium.

Meanwhile, the effect described in this specification is illustrative only and is not limitative; there may also be another effect.

Meanwhile, this technology may also have a following configuration.

(1) An interface circuit including:
a first transmitting unit which transmits a first signal including a clock component to an external device through a transmission path as a differential signal;
a second transmitting unit which superimposes a second signal including a clock component on the transmission path as an in-phase signal to transmit to the external device; and
a state notifying unit which communicates with the external device through a pair of differential transmission paths included in the transmission path and notifies the external device of a connection state of its own device by a DC bias potential of at least one of the pair of differential transmission paths.

(2) The interface circuit according to (1) described above, wherein the first signal is an audio signal.

(3) The interface circuit according to (1) or (2) described above, further including: a communication unit which performs communication for encrypting and decrypting the first signal with the external device through a second transmission path different from the transmission path.

(4) The interface circuit according to (3) described above, wherein the transmission path is a utility line and a hot plug detect line forming an HDMI cable, and the second transmission path is a display data channel forming the HDMI cable.

(5) An interface circuit including:
a first transmitting unit which transmits a first signal including a clock component to an external device through a transmission path as a differential signal;
a second transmitting unit which superimposes a second signal for decrypting the first signal on the transmission path as an in-phase signal to transmit to the external device; and
a state notifying unit which communicates with the external device through a pair of differential transmission paths included in the transmission path and notifies the external device of a connection state of its own device by a DC bias potential of at least one of the pair of differential transmission paths.

(6) The interface circuit according to (5) described above, wherein the first signal is an audio signal.

(7) The interface circuit according to (5) or (6) described above, wherein the transmission path is a utility line and a hot plug detect line forming an HDMI cable.

(8) An interface circuit including:
a first transmitting unit which transmits a first signal to an external device through a transmission path as a differential signal;
a second transmitting unit which superimposes a second signal including a clock component of the first signal on the transmission path as an in-phase signal to transmit to the external device; and
a state notifying unit which communicates with the external device through a pair of differential transmission paths included in the transmission path and notifies the external device of a connection state of its own device by a DC bias potential of at least one of the pair of differential transmission paths.

(9) The interface circuit according to (8) described above, wherein the first signal is an audio signal.

(10) The interface circuit according to (8) or (9) described above, wherein the transmission path is a utility line and a hot plug detect line forming an HDMI cable.

(11) An interface circuit including:
a first receiving unit which extracts a first signal including a clock component from a differential signal received from an external device through a transmission path;
a second receiving unit which extracts a second signal including a clock component from an in-phase signal received from the external device through the transmission path; and
a state receiving unit which communicates with the external device through a pair of differential transmission paths included in the transmission path and is notified by the external device of a connection state by a DC bias potential of at least one of the pair of differential transmission paths.

(12) The interface circuit according to (11) described above, wherein the first signal is an audio signal.

(13) The interface circuit according to (11) or (12) described above, further including: a communication unit which performs communication for encrypting and decrypting the first signal with the external device through a second transmission path different from the transmission path.

(14) The interface circuit according to any one of (11) to (13) described above, wherein
the transmission path is a utility line and a hot plug detect line forming an HDMI cable, and
the second transmission path is a display data channel forming the HDMI cable.

(15) An interface circuit including:
a first receiving unit which extracts a first signal including a clock component from a differential signal received from an external device through a transmission path; a second receiving unit which extracts a second signal for decrypting the first signal from an in-phase signal received from the external device through the transmission path; and a state receiving unit which communicates with the external device through a pair of differential transmission paths included in the transmission path and is notified by the external device of a connection state by a DC bias potential of at least one of the pair of differential transmission paths.

(16) The interface circuit according to (15) described above, wherein the first signal is an audio signal.

(17) The interface circuit according to (15) or (16) described above, wherein the transmission path is a utility line and a hot plug detect line forming an HDMI cable.

(18) An interface circuit including:
a first receiving unit which extracts a first signal from a differential signal received from an external device through a transmission path;
a second receiving unit which extracts a second signal including a clock component of the first signal from an in-phase signal received from the external device through the transmission path; and
a state receiving unit which communicates with the external device through a pair of differential transmission paths included in the transmission path and is notified by the external device of a connection state by a DC bias potential of at least one of the pair of differential transmission paths.

(19) The interface circuit according to (18) described above, wherein the first signal is an audio signal.

(20) The interface circuit according to (18) or (19) described above, wherein the transmission path is a utility line and a hot plug detect line forming an HDMI cable.

(21) An information processing system obtained by connecting a first interface circuit and a second interface circuit to each other through a transmission path, wherein
the first interface circuit is provided with a first transmitting unit which transmits a first signal including a clock component to the second interface circuit through the transmission path as a differential signal, a second transmitting unit which superimposes a second signal including a clock component on the transmission path as an in-phase signal to transmit to the second interface circuit, and a state notifying unit which communicates with the second interface circuit through a pair of differential transmission paths included in the transmission path and notifies the second interface circuit of a connection state of the first interface circuit by a DC bias potential of at least one of the pair of differential transmission paths, and
the second interface circuit is provided with a first receiving unit which extracts the first signal including the clock component from the differential signal received from the first interface circuit through the transmission path, a second receiving unit which extracts the second signal including the clock component from the in-phase signal received from the first interface circuit through the transmission path, and a state receiving unit which communicates with the first interface circuit through the pair of differential transmission paths included in the transmission path and is notified by the first interface circuit of the connection state by the DC bias potential of at least one of the pair of differential transmission paths.

REFERENCE SIGNS LIST

10 Transmitter
11 Transmitting unit
12 Encrypting unit
13, 23 Communication unit
14, 24 Authentication/key exchange unit
20 Receiver
21 Receiving unit
22 Decrypting unit
100 Source device
101 Transmitter
110 Sink device model detecting circuit
120 Plug connection detecting circuit
140 Source side receiving circuit
160 In-phase signal receiving circuit
170 Differential signal receiving circuit
200 Sink device
201 Receiver
210 Source device model detecting circuit
220 Plug connection transferring circuit
250 Sink side transmitting circuit
260 In-phase signal transmitting circuit
270 Differential signal transmitting circuit
300 Cable
310, 320, 330 TMDS channel
340 TMDS clock channel
350 Display data channel (DDC)
361 CEC line
362 Utility line
363 Hot plug detect (HPD) line
500 Disc player
600 Television receiver
700 Digital camera

The invention claimed is:

1. An information processing apparatus, comprising:
one or more interface circuits configured to:
transmit a first signal by a differential signal to an external device through a pair of a utility line and a Hot Plug Detect (HPD) line of a High Definition Multimedia Interface (HDMI) cable,
wherein the first signal includes a first clock component and an audio signal;
transmit a second signal by an in-phase signal to the external device through the pair of the utility line and the HPD line,
wherein the second signal includes a second clock component;
notify the external device of a connection state of the information processing apparatus through the HPD line by control of a voltage; and
communicate with the external device through a Display Data Channel (DDC) of the HDMI cable; and
one or more control circuits configured to control processing data corresponding to the first signal.

2. The information processing apparatus according to claim 1, wherein the first signal and the second signal are superimposed for transmission through the pair of the utility line and the HPD line.

3. The information processing apparatus according to claim 1, wherein the one or more interface circuits are further configured to communicate with the external device based on an access of a DDC register through the DDC.

4. The information processing apparatus according to claim 3, wherein the DDC register is coupled to the external device.

5. The information processing apparatus according to claim 1, wherein the transmission of the first signal to the external device is in a direction opposite to a transmission direction of a Transition Minimized Differential Signaling (TMDS) channel of the HDMI cable.

6. The information processing apparatus according to claim 5, wherein the one or more interface circuits are further configured to receive at least one of a video signal or the audio signal from the external device through the TMDS channel.

7. The information processing apparatus according to claim 1, further comprising
a remote control receiver configured to receive a user control command from a remote controller, wherein
the user control command corresponds to an operation for the transmission of the first signal to the external device, and
the one or more control circuits are further configured to control, based on the user control command, the operation for the transmission of the first signal to the external device.

8. The information processing apparatus according to claim 1, wherein the one or more control circuits are further configured to control, based on an activation of the external device, an operation for the transmission of the first signal to the external device.

9. The information processing apparatus according to claim 1, further comprising a display panel configured to display video data,
wherein the display panel is one of a Liquid Crystal Display (LCD) panel, a Plasma Display Panel (PDP), or an organic electro-luminescence panel.

10. The information processing apparatus according to claim 9, wherein the one or more control circuits are further configured to:
decode content data received from one of a broadcast tuner, a network interface, or an HDMI interface, wherein the content data corresponds to audio data and the video data;
output the video data to the display panel based on the decode of the content data; and
output, based on the decode of the content data, the audio data corresponding to the first signal to the external device.

11. The information processing apparatus according to claim 10, further comprising the broadcast tuner and the network interface.

12. An interface device, comprising:
one or more interface circuits configured to:
transmit a first signal by a differential signal to an external device through a pair of a utility line and a Hot Plug Detect (HPD) line of a High Definition Multimedia Interface (HDMI) cable,
wherein the first signal includes a first clock component and an audio signal;
transmit a second signal by an in-phase signal to the external device through the pair of the utility line and the HPD line,
wherein the second signal includes a second clock component;
notify the external device of a connection state of the interface device through the HPD line by control of a voltage; and
communicate with the external device through a Display Data Channel (DDC) of the HDMI cable.

13. The interface device according to claim 12, wherein the first signal and the second signal are superimposed for transmission through the pair of the utility line and the HPD line.

14. The interface device according to claim 12, wherein the one or more interface circuits are further configured to communicate with the external device based on an access of a DDC register through the DDC.

15. The interface device according to claim 14, wherein the DDC register is coupled to the external device.

16. An interface system, comprising:
first circuitry that comprises one or more first interface circuits; and
second circuitry that comprises one or more second interface circuits, wherein
the first circuitry is connected to the second circuitry through a High Definition Multimedia Interface (HDMI) cable, and
the one or more second interface circuits are configured to:
transmit a first signal by a differential signal to the first circuitry through a pair of a utility line and a Hot Plug Detect (HPD) line of the HDMI cable, wherein the first signal includes a first clock component and an audio signal;
transmit a second signal by an in-phase signal to the first circuitry through the pair of the utility line and the HPD line, wherein the second signal includes a second clock component;
notify the first circuitry of a connection state of the second circuitry through the HPD line by control of a voltage; and
communicate with the first circuitry through a Display Data Channel (DDC) of the HDMI cable.

17. The interface system according to claim 16, wherein the first signal and the second signal are superimposed for transmission through the pair of the utility line and the HPD line.

18. The interface system according to claim 16, wherein the one or more second interface circuits are further configured to communicate with the first circuitry based on an access of a DDC register through the DDC.

19. The interface system according to claim 18, wherein the DDC register is coupled to a device in which the first circuitry is implemented.

20. The interface system according to claim 16, wherein the transmission of the first signal to the first circuitry is in a direction opposite to a transmission direction of a Transition Minimized Differential Signaling (TMDS) channel of the HDMI cable.

\* \* \* \* \*